(12) United States Patent
Xu et al.

(10) Patent No.: US 11,354,779 B2
(45) Date of Patent: Jun. 7, 2022

(54) POINT CLOUD DENOISING SYSTEMS AND METHODS

(71) Applicant: FLIR Systems, Inc., Wilsonville, OR (US)

(72) Inventors: Zhongwei Xu, Tampere (FI); Alessandro Foi, Tampere (FI)

(73) Assignee: Teledyne FLIR, LLC, Thousand Oaks, CA (US)

( * ) Notice: Subject to any disclaimer, the term of this patent is extended or adjusted under 35 U.S.C. 154(b) by 0 days.

(21) Appl. No.: 16/911,169

(22) Filed: Jun. 24, 2020

(65) Prior Publication Data

US 2020/0327646 A1    Oct. 15, 2020

Related U.S. Application Data

(63) Continuation of application No. PCT/US2018/068032, filed on Dec. 28, 2018.

(60) Provisional application No. 62/785,673, filed on Dec. 27, 2018, provisional application No. 62/612,305, filed on Dec. 29, 2017.

(51) Int. Cl.
 *G06T 5/00* (2006.01)
 *G06T 5/20* (2006.01)

(52) U.S. Cl.
 CPC ............. *G06T 5/002* (2013.01); *G06T 5/20* (2013.01); *G06T 2207/10028* (2013.01); *G06T 2207/10048* (2013.01); *G06T 2207/20012* (2013.01)

(58) Field of Classification Search
 None
 See application file for complete search history.

(56) References Cited

U.S. PATENT DOCUMENTS

| | | | | |
|---|---|---|---|---|
| 8,463,006 B2* | 6/2013 | Prokoski | ............... | G06T 7/0012 382/128 |
| 2012/0293615 A1* | 11/2012 | Chen | ............... | G06T 5/003 348/43 |
| 2014/0153784 A1* | 6/2014 | Gan | ............... | G06T 7/593 382/107 |

(Continued)

OTHER PUBLICATIONS

Sankaranarayanan et al., A Fast k-Neighborhood Algorithm for Large Point-Clouds, Eurographics Symposium on Point-Based Graphics (2006) (Year: 2006).*

(Continued)

*Primary Examiner* — Andrae S Allison
(74) *Attorney, Agent, or Firm* — Haynes and Boone, LLP

(57) ABSTRACT

Techniques are disclosed for point cloud denoising systems and methods. In one example, a method includes determining a respective local coordinate system for each point of a point cloud. The method further includes determining a respective first adaptive-shape neighborhood for each point of the point cloud based on each respective local coordinate system. The method further includes performing filtering associated with each respective first adaptive-shape neighborhood to obtain a respective second adaptive-shape neighborhood for each point of the point cloud. The method further includes determining local estimates for points inside each of the second adaptive-shape neighborhoods. The method further includes aggregating the local estimates for each point of the point cloud to obtain a denoised point cloud. Related devices and systems are also provided.

20 Claims, 23 Drawing Sheets

(56) References Cited

U.S. PATENT DOCUMENTS

| | | | | |
|---|---|---|---|---|
| 2014/0198977 | A1* | 7/2014 | Narasimha | G06T 5/007 |
| | | | | 382/154 |
| 2018/0096525 | A1* | 4/2018 | Turner | G06T 7/90 |
| 2018/0330473 | A1* | 11/2018 | Foi | G06T 7/337 |
| 2018/0330474 | A1* | 11/2018 | Mehta | G06T 3/4061 |
| 2019/0291723 | A1* | 9/2019 | Srivatsa | G06T 19/006 |
| 2019/0311546 | A1* | 10/2019 | Tay | G06T 19/006 |
| 2021/0158554 | A1* | 5/2021 | Asawaroengchai | G06T 7/55 |

OTHER PUBLICATIONS

Z. Xu and A. Foi, "Anisotropic Denoising of 3D Point Clouds by Aggregation of Multiple Surface-Adaptive Estimates," in IEEE Transactions on Visualization and Computer Graphics, vol. 27, No. 6, pp. 2851-2868, Jun. 1, 2021, doi: 10.1109/TVCG.2019.2959761. (Year: 2021).*

Kadambi, Achuta, Ayush Bhandari, and Ramesh Raskar. "3d depth cameras in vision: Benefits and limitations of the hardware." Computer vision and machine learning with RGB-D sensors. Springer, Cham, 2014. 3-26. (Year: 2014).*

Mitra, Niloy J., and An Nguyen. "Estimating surface normals in noisy point cloud data." Proceedings of the nineteenth annual symposium on Computational geometry. 2003. (Year: 2003).*

Duan, Chaojing, Siheng Chen, and Jelena Kovacevic. "3D point cloud denoising via deep neural network based local surface estimation." ICASSP 2019-2019 IEEE International Conference on Acoustics, Speech and Signal Processing (ICASSP). IEEE, 2019. (Year: 2019).*

Yang, Daoshan Ou, and Hsi-Yung Feng. "On the normal vector estimation for point cloud data from smooth surfaces." Computer Aided Design 37.10 (2005): 1071-1079. (Year: 2005).*

Sanchez, Julia, et al. "Robust normal vector estimation in 3D point clouds through iterative principal component analysis." ISPRS Journal of Photogrammetry and Remote Sensing 163 (2020): 18-35. (Year: 2020).*

Sergey Smirnov et al., "Methods for depth-map filtering in view-plus-depth 3D video representation", Eurasip Journal of Applied Signal Processing, vol. 2012, No. 1, Dec. 1, 2012 (Dec. 1, 2012), 21 pages.

Alessandro Foi, "Anisotropic nonparametric image processing: theory, algorithms and applications", PhD Thesis, Apr. 2005 (Apr. 1, 2005), 174 pages.

Alessandro Foi et al., "Pointwise Shape-Adaptive DCT for High-Quality Denoising and Deblocking of Grayscale and Color Images", IEEE Transactions on Image Processing, IEEE Service Center, Piscataway, NJ, US, vol. 16, No. 5, May 1, 2007, 17 pages.

Schoenenberger et al., "Graph-Based Denoising for Time-Varying Point Clouds", Signal Processing Laboratory (LTS2), Ecole Polytechnique F'ed'erale de Lausanne, 1015, Switzerland, Nov. 2015, 5 pages.

Cristhian Aguilera et al., "Multispectral Image Feature Points", Sensors, vol. 12, No. 9, pp. 12661-12672, 2012, 12 pages.

Vladimir Katkovnik, "A New Method for Varying Adaptive Bandwidth Selection", IEEE Transactions on Signal Processing, vol. 47, No. 9, Sep. 1999, 5 pages.

Zhongwei Xu et al., "Anisotropic Denoising of 3D Point Clouds by Aggregation of Multiple Surface-Adaptive Estimates", IEEE Transactions on Visualization and Computer Graphics, Dec. 16, 2019, 9 pages.

Noah Snavely, Software, "Bundler: Structure from Motion (SfM) for Unordered Image Collections", Retrieved from the Internet, URL:<http://phototour.cs.washington.edu/bundler/>, [Online; accessed ¬Mar. 8, 2017].

Yasutaka Furukawa et al., Software, "Patch-based Multi-view Stereo Software (PMVS-Version 2)", Retrieved from the Internet, URL:<http://www.di.ens.fr/pmvs/>, [Online; accessed Mar. 8, 2017].

* cited by examiner

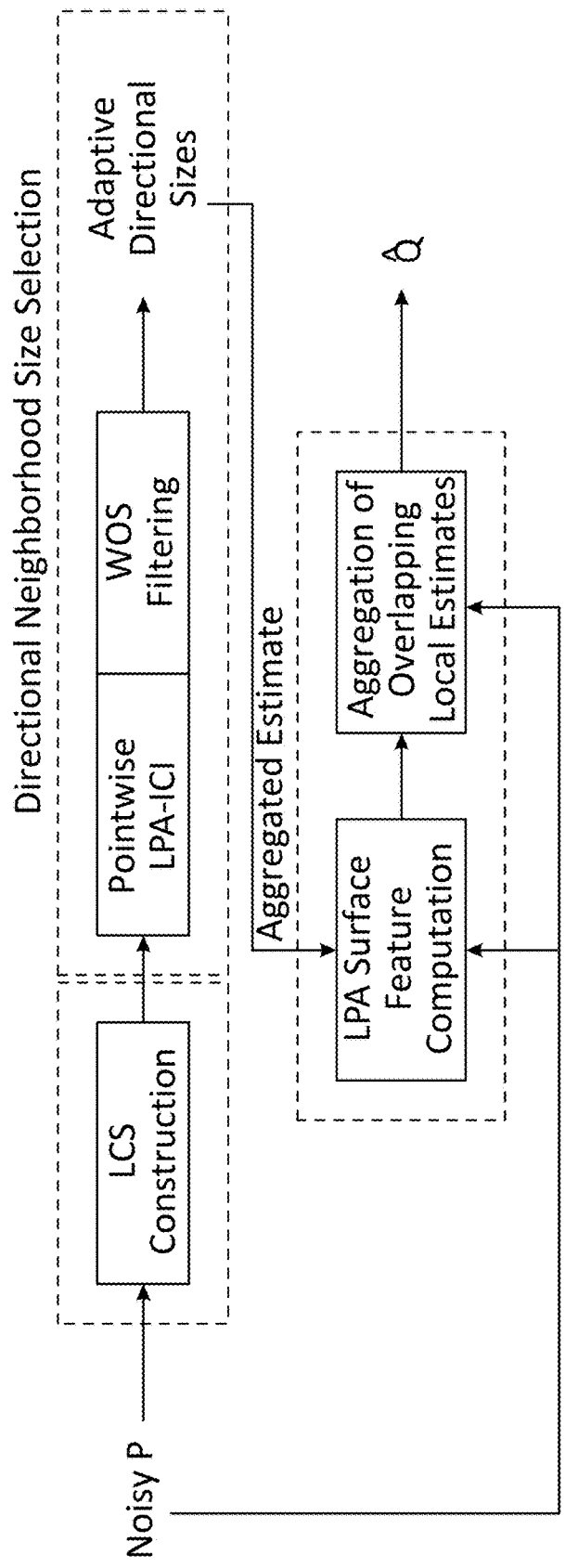
FIG. 4
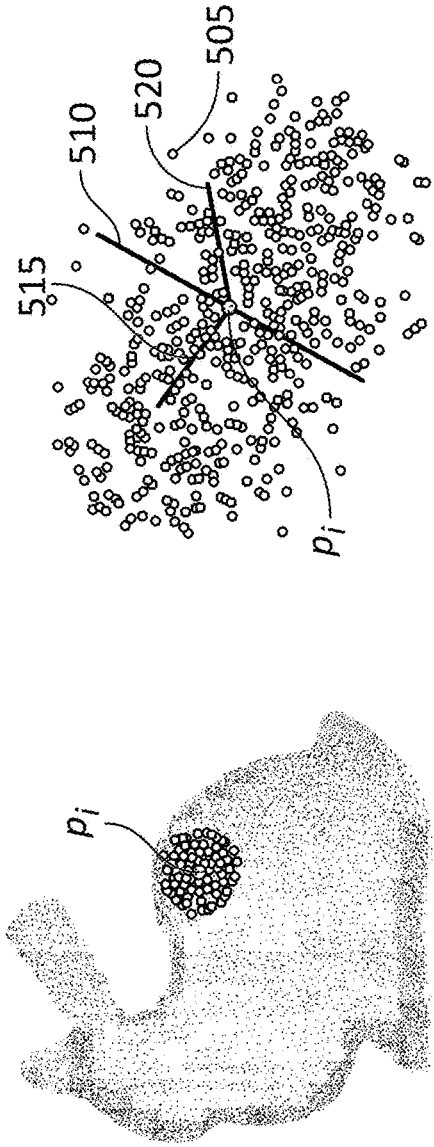
FIG. 5A
FIG. 5B before WOS after WOS before WOS after WOS

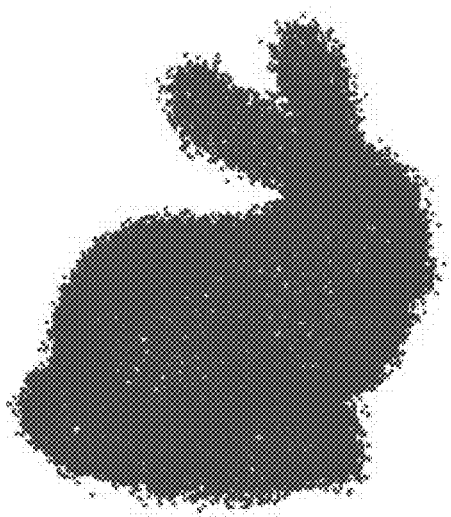
FIG. 13A
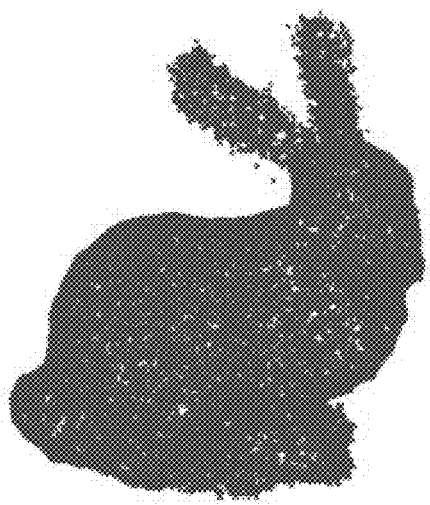
FIG. 13B
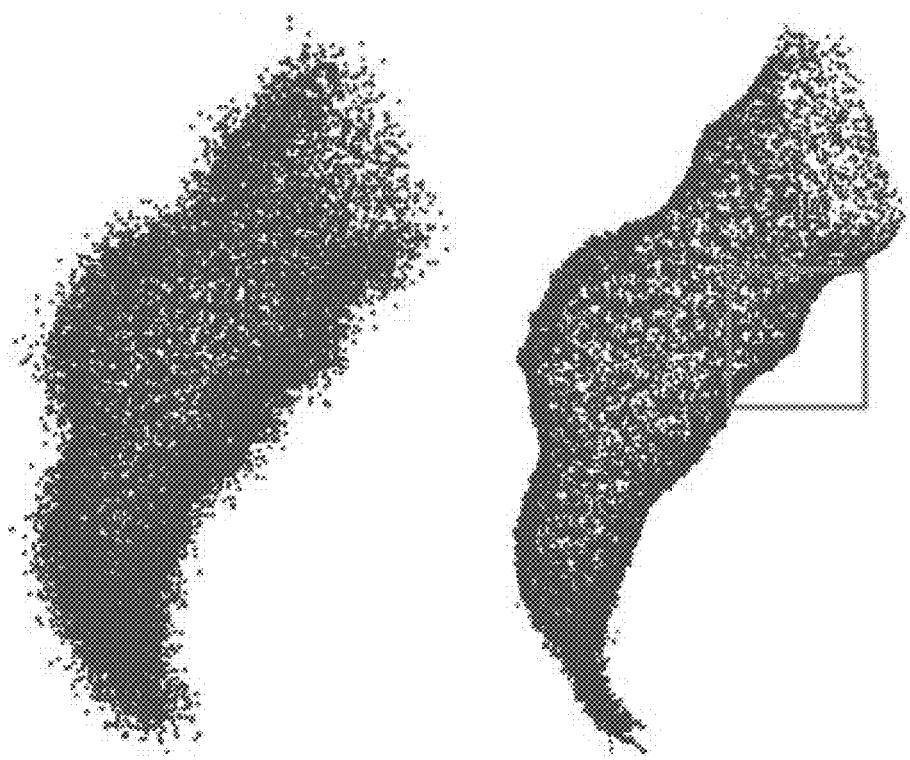
FIG. 13C
FIG. 13D

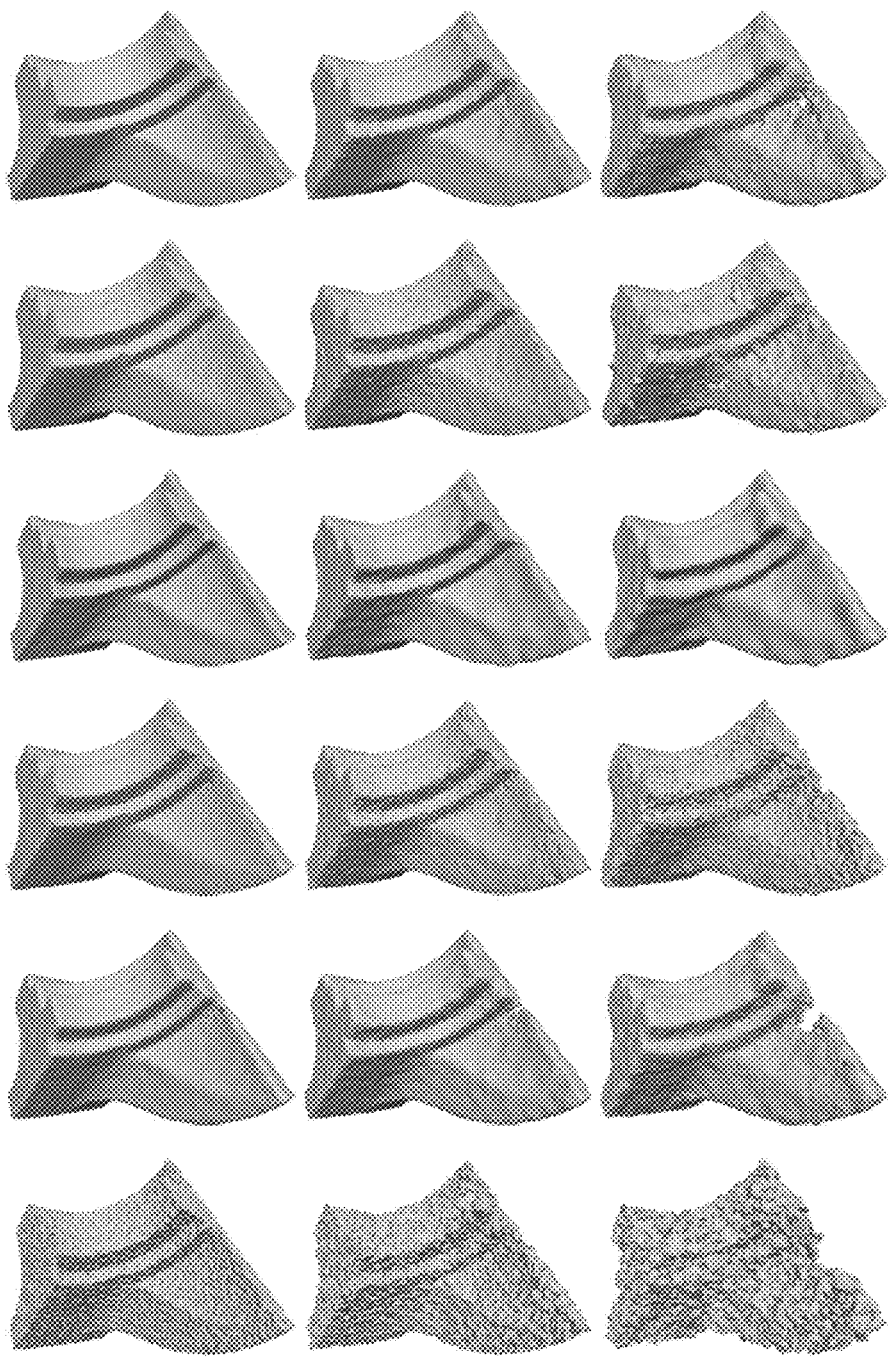

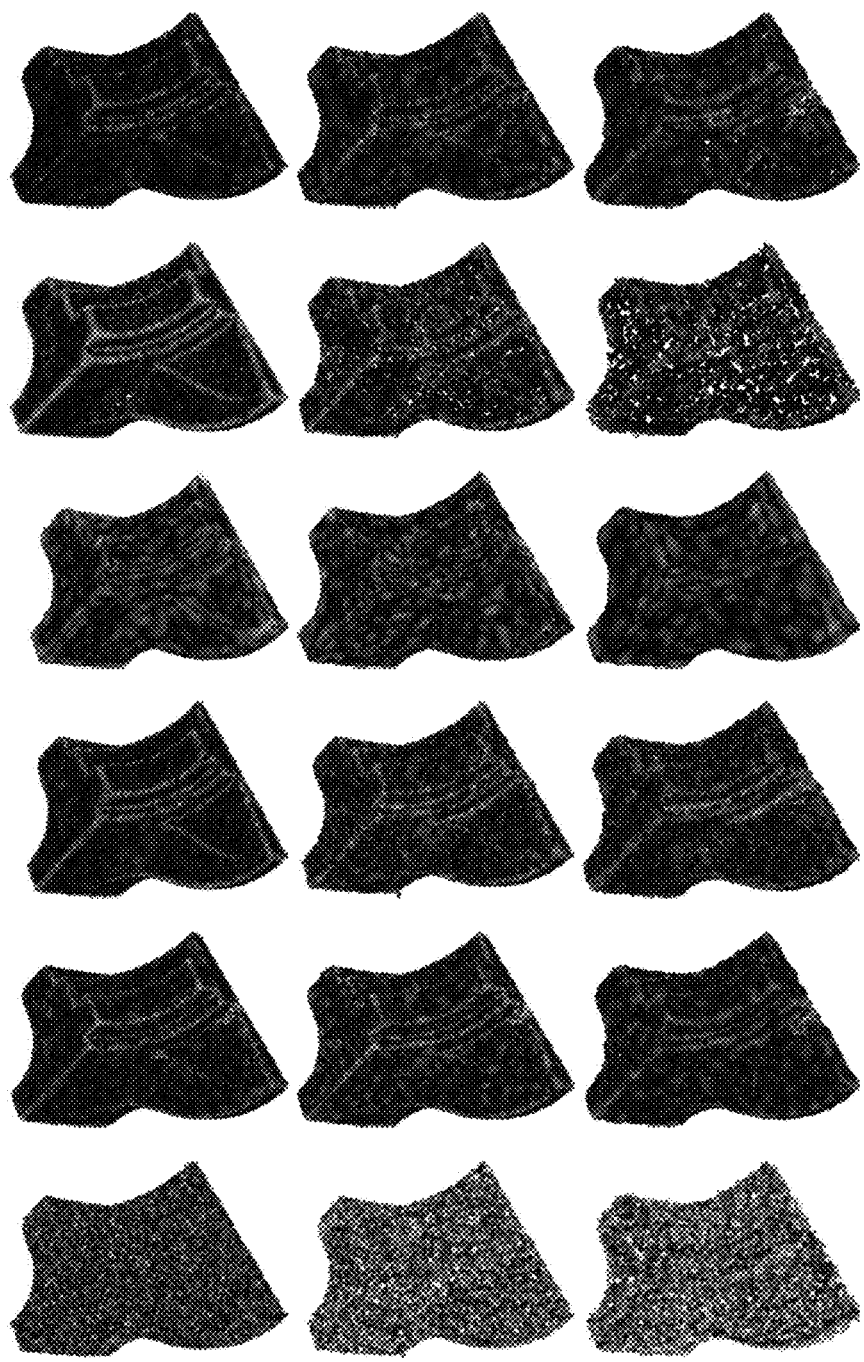

POINT CLOUD DENOISING SYSTEMS AND METHODS

CROSS-REFERENCE TO RELATED APPLICATIONS

This application is a continuation of International Patent Application No. PCT/US2018/068032 filed Dec. 28, 2018 and entitled "POINT CLOUD DENOISING SYSTEMS AND METHODS," which is incorporated herein by reference in its entirety.

International Patent Application No. PCT/US2018/068032 filed Dec. 28, 2018 claims priority to and the benefit of U.S. Provisional Patent Application No. 62/785,673 filed Dec. 27, 2018 and entitled "POINT CLOUD DENOISING SYSTEMS AND METHODS" and U.S. Provisional Patent Application No. 62/612,305 filed Dec. 29, 2017 and entitled "POINT CLOUD DENOISING SYSTEMS AND METHODS," which are all hereby incorporated by reference in their entirety.

TECHNICAL FIELD

One or more embodiments relate generally to imaging systems and more particularly, for example, to point cloud denoising systems and methods.

BACKGROUND

Imaging systems may include an array of detectors, with each detector functioning as a pixel to produce a portion of a two-dimensional image. There are a wide variety of image detectors, such as visible image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, a method includes determining a respective local coordinate system for each point of a point cloud. The method further includes determining a respective first adaptive-shape neighborhood for each point of the point cloud based on each respective local coordinate system. The method further includes performing filtering associated with each respective first adaptive-shape neighborhood to obtain a respective second adaptive-shape neighborhood for each point of the point cloud. The method further includes determining local estimates for points inside each of the second adaptive-shape neighborhoods. The method further includes aggregating the local estimates for each point of the point cloud to obtain a denoised point cloud.

In one or more embodiments, an imaging system includes one or more processors and a non-transitory machine readable medium comprising instructions stored therein, which when executed by the one or more processors, cause the one or more processors to perform the above method. In this regard, in one example, operations include determining a respective local coordinate system for each point of a point cloud. The operations further include determining a respective first adaptive-shape neighborhood for each point of the point cloud based on each respective local coordinate system. The operations further include performing filtering associated with each respective first adaptive-shape neighborhood to obtain a respective second adaptive-shape neighborhood for each point of the point cloud. The operations further include determining local estimates for points inside each of the second adaptive-shape neighborhoods. The operations further include aggregating the local estimates to obtain a denoised point cloud.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 4 illustrates a flowchart of an example point cloud denoising pipeline in accordance with one or more embodiments of the present disclosure.

FIGS. 5A and 5B illustrate computing the local coordinate system (LCS) for one point in a noisy Bunny point cloud. In FIG. 5A, one point and its K nearest neighbors (KNN) are shown. In FIG. 5B, a zoomed-in view of FIG. 5A is provided, in which the one point, K nearest neighbors, and the three principle axes of the LCS are shown.

FIG. 13A illustrates an example noisy Bunny point cloud.

FIG. 13B illustrates a denoised result of the Bunny point cloud after applying denoising in accordance with one or more embodiments of the present disclosure.

FIG. 13C illustrates an example noisy Armadillo Arm point cloud.

FIG. 13D illustrates a denoised result of the Armadillo Arm point cloud after applying denoising in accordance with one or more embodiments of the present disclosure.

FIG. 14A illustrates reconstructed 3D surfaces of noisy Fandisk point clouds, with σ equal to 0.005 (topmost of column), 0.01 (middle of column), and 0.02 (bottom of column).

FIGS. 14B, 14C, 14D, and 14E illustrate 3D surfaces of the denoised results of FIG. 14A by applying MLS, bilateral, RIMLS, and graph-based regularization, respectively.

FIG. 14F illustrates 3D surfaces of the denoised results of FIG. 14A by applying denoising in accordance with one or more embodiments of the present disclosure.

FIGS. 15A-15F illustrate the point-to-surface distances of the noisy or denoised point clouds of FIGS. 14A-14F, respectively, using color.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
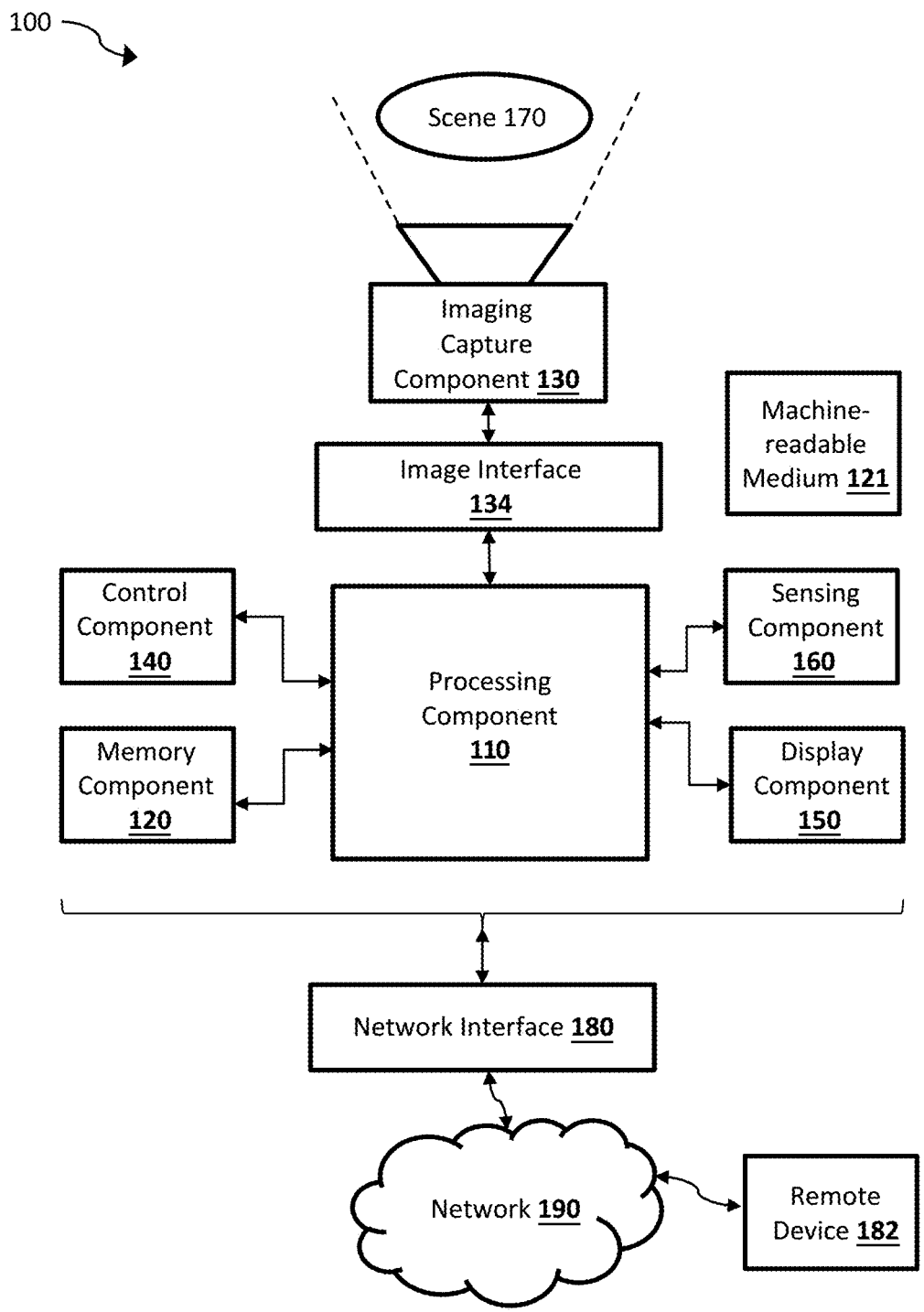
FIG. 1 illustrates a block diagram of an example imaging system in accordance with an embodiment of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

In some embodiments, techniques are provided for denoising point clouds, such as to improve spatial accuracy (e.g., position) of the sampled points in 3D space. In this regard, methods for generating point clouds out of a set of 2D images are generally heavily dependent on the resolution and contrast of the images. Techniques provided herein may allow for the construction of a point cloud with a spatial density based on (e.g., limited by) information from a sensor with high spatial resolution and high contrast, but with a signal value (e.g., unit of measure) from a second (e.g., potentially lower resolution) imager of a different modality.

In some aspects, visible spectrum (vis) images may be used with infrared (IR) images to construct a clean and dense 3D point cloud (PCD) with multi-spectral channels, presenting color and temperature information of a real world scene. For example, in some cases, multi-spectral 3D scene construction may be provided using visible and infrared images taken from a dual-sensor device and/or separate visible and infrared imagers. In some cases, a technique may be provided to adaptively densify and/or denoise different parts of a generated 3D PCD model. The local point density and noise level may be determined in each part of the 3D point cloud, and based on this information the densification and denoising of each local point cloud region may be performed (e.g., performed independently) while preserving the sharp edges and corners inside.

In some cases, use of visible spectrum aided super resolution (vis-aided-sr) in a 3D application, such as to match the resolution of the lower resolution modality sensors (e.g., thermal) to that of the higher resolution sensor. In this manner, 3D points generated by the high resolution imager have an equivalent from the low resolution sensor without blurring artifacts of upsampling that may generally be present. In an aspect, high spatial frequency edges in 3D space may be retained while correcting positional errors of points in the point cloud. For example, sharp corners and edges may be preserved while denoising (flattening) smooth surfaces to provide high quality 3D images.

Thus, using various embodiments, techniques provided herein may be utilized to facilitate construction of 3D point clouds (e.g., 3D point cloud models), such as from multiple images, densification of point clouds, and/or denoising of point clouds. In some aspects, a 3D point cloud is reconstructed by using a set of views of a scene. The obtained point cloud may be improved by alleviating noise affecting the points in the cloud (e.g., through denoising) and/or by adding more points to the cloud (e.g., through densification) to obtain a denser point cloud.

FIG. 1 illustrates a block diagram of an example imaging system 100 (e.g., an infrared imaging system) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images and videos (e.g., video frames) in accordance with an embodiment of the disclosure. The imaging system 100 includes, according to one implementation, a processing component 110, a memory component 120, an image capture component 130, an image interface 134, a control component 140, a display component 150, a sensing component 160, and/or a network interface 180. In an embodiment, the imaging system 100 may include a portable device and may be incorporated, for example, into a vehicle (e.g., an automobile or other type of land-based vehicle, an unmanned aerial vehicle (UAV), unmanned aircraft system (UAS), drone, or other type of aircraft or spacecraft) or a non-mobile installation requiring images to be stored and/or displayed.

The imaging system 100 may represent an imaging device, such as a video and/or still camera, to capture and process images and/or videos of a scene 170. In this regard, the image capture component 130 of the imaging system 100 may be configured to capture images (e.g., still and/or video images) of the scene 170 in a particular spectrum or modality. For example, in some embodiments, the image capture component 130 may include a complementary metal oxide semiconductor (CMOS) sensor or a charge-coupled device (CCD) sensor that can be found in any consumer camera (e.g., visible light camera). In some other embodiments, alternatively or in addition, the image capture component 130 may include an infrared (IR) imaging sensor configured to detect IR radiation in the near, middle, and/or far IR spectrum and provide IR images (e.g., IR image data or signal) representative of the IR radiation from the scene 170. In one specific, not-limiting example, the image capture component 130 may comprise a thermal IR imaging sensor having a focal plane array (FPA) of detectors responsive to thermal IR radiation including short-wave IR (SWIR), mid-wave IR (MWIR), and/or long-wave IR (LWIR) radiation.

Other imaging sensors that may be embodied in the image capture component 130 include a PMD imaging sensor or other ToF imaging sensor, LIDAR imaging device, millimeter imaging device, PET scanner, SPECT scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 130 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The processing component 110, according to various embodiments, includes one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. The processing component 110 may be configured to interface and communicate with various other components of the imaging system 100 to perform such operations. In one aspect, the processing component 110 may be configured to perform various system control operations (e.g., to control communications and operations of various components of the imaging system 100) and other image processing operations (e.g., data conversion, video analytics, noise suppression), as part of or separate from the operations to remove non-uniformity data from images.

In some embodiments, a separate machine-readable medium 121 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations disclosed herein. In one aspect, machine-readable medium 121 may be portable and/or located separate from system 100, with the stored software instructions and/or data provided to system 100 by coupling the computer-readable medium to system 100 and/or by system 100 downloading (e.g., via a wired link and/or a wireless link) from computer-readable medium 121.

The memory component 120 includes, in one embodiment, one or more memory devices configured to store data and information, including video image data and information. The memory component 120 may include one or more various types of memory devices including volatile and non-volatile memory devices, such as random access memory (RAM), read-only memory (ROM), electrically-erasable programmable read-only memory (EEPROM), flash memory, hard disk drive, and/or other types of memory. As discussed above, the processing component 110 may be configured to execute software instructions stored in the memory component 120 so as to perform method and process steps and/or operations described herein. The processing component 110 and/or image interface 134 may be configured to store in the memory component 120 images or digital image data captured by the image capture component 130. The processing component 110 may be configured to store processed still and/or video images in the memory component 120.

The image interface 134 may include, in some embodiments, appropriate input ports, connectors, switches, and/or circuitry configured to interface with external devices (e.g., a remote device 182 and/or other devices) to receive images (e.g., digital image data) generated by or otherwise stored at the external devices. The received images or image data may be provided to the processing component 110. In this regard, the received images or image data may be converted into signals or data suitable for processing by the processing component 110. For example, in one embodiment, the image interface 134 may be configured to receive analog video data and convert it into suitable digital data to be provided to the processing component 110.

In some embodiment, the image interface 134 may include various standard video ports, which may be connected to a video player, a video camera, or other devices capable of generating standard video signals, and may convert the received video signals into digital video/image data suitable for processing by the processing component 110. In some embodiments, the image interface 134 may also be configured to interface with and receive images (e.g., image data) from the image capture component 130. In other embodiments, the image capture component 130 may interface directly with the processing component 110.

The control component 140 includes, in one embodiment, a user input and/or interface device, such as a rotatable knob (e.g., potentiometer), push buttons, slide bar, keyboard, and/or other devices, that is adapted to generate a user input control signal. The processing component 110 may be configured to sense control input signals from a user via the control component 140 and respond to any sensed control input signals received therefrom. The processing component 110 may be configured to interpret such a control input signal as a value, as generally understood by one skilled in the art. In one embodiment, the control component 140 may include a control unit (e.g., a wired or wireless handheld control unit) having push buttons adapted to interface with a user and receive user input control values. In one implementation, the push buttons of the control unit may be used to control various functions of the imaging system 100, such as autofocus, menu enable and selection, field of view, brightness, contrast, noise filtering, image enhancement, and/or various other features of an imaging system or camera.

The display component 150 includes, in one embodiment, an image display device (e.g., a liquid crystal display (LCD)) or various other types of generally known video displays or monitors. The processing component 110 may be configured to display image data and information on the display component 150. The processing component 110 may be configured to retrieve image data and information from the memory component 120 and display any retrieved image data and information on the display component 150. The display component 150 may include display circuitry, which may be utilized by the processing component 110 to display image data and information. The display component 150 may be adapted to receive image data and information directly from the image capture component 130, processing component 110, and/or video interface component 134, or the image data and information may be transferred from the memory component 120 via the processing component 110.

The sensing component 160 includes, in one embodiment, one or more sensors of various types, depending on the application or implementation requirements, as would be understood by one skilled in the art. Sensors of the sensing component 160 provide data and/or information to at least the processing component 110. In one aspect, the processing component 110 may be configured to communicate with the sensing component 160. In various implementations, the sensing component 160 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 160 may represent conventional sensors as generally known by one skilled in the art for monitoring various conditions (e.g., environmental conditions) that may have an effect (e.g., on the image appearance) on the image data provided by the image capture component 130.

In some implementations, the sensing component 160 (e.g., one or more of sensors) may comprise devices that relay information to the processing component 110 via wired and/or wireless communication. For example, the sensing component 160 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 110 can use the information (e.g., sensing data) retrieved from the sensing component 160 to modify a configuration of the image capture component 130 (e.g., adjusting a light sensitivity level, adjusting a direction or angle of the image capture component 130, adjusting an aperture, etc.).

In various embodiments, various components of the imaging system 100 may be combined and/or implemented or not, as desired or depending on the application or requirements. In one example, the processing component 110 may be combined with the memory component 120, image capture component 130, video interface component 134, display component 150, network interface 180, and/or sensing component 160. In another example, the processing component 110 may be combined with the image capture component 130, such that certain functions of processing component 110 are performed by circuitry (e.g., a processor, a microprocessor, a logic device, a microcontroller, etc.) within the image capture component 130.

Furthermore, in some embodiments, various components of the imaging system 100 may be distributed and in communication with one another over a network 190. In this regard, the imaging system 100 may include a network interface 180 configured to facilitate wired and/or wireless communication among various components of the imaging system 100 over the network 190. In such embodiments, components may also be replicated if desired for particular applications of system 100. That is, components configured for same or similar operations may be distributed over a network. Further, all or part of any one of the various components may be implemented using appropriate components of a remote device 182 (e.g., a conventional digital video recorder (DVR), a computer configured for image processing, and/or other device) in communication with various components of the imaging system 100 via the network interface 180 over the network 190, if desired. Thus, for example, all or part of the processing component 110, all or part of the memory component 120, and/or all of part of the display component 150 may be implemented or replicated at the remote device 182, and configured to perform resolution enhancement of images as further described herein. In some embodiments, the imaging system 100 may not comprise imaging sensors (e.g., image capture component 130), but instead receive images or image data from imaging sensors located separately and remotely from the processing component 110 and/or other components of the imaging system 100. It will be appreciated that many other combinations of distributed implementations of the imaging system 100 are possible, without departing from the scope and spirit of the disclosure.

Figure 2:
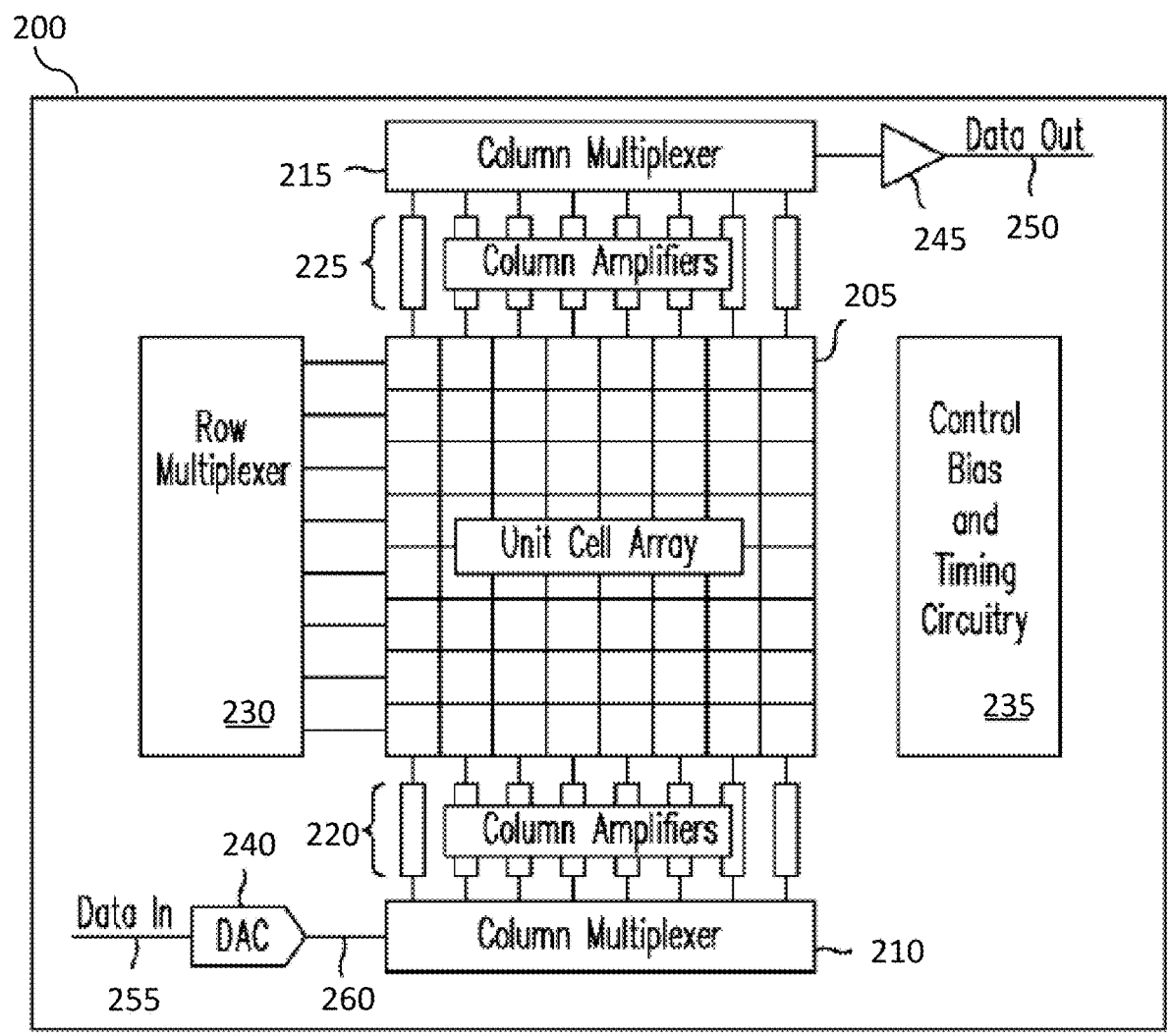
FIG. 2 illustrates a block diagram of an example image sensor assembly in accordance with one or more embodiments of the present disclosure.

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be a focal plane array, for example, implemented as an image sensor in the image capture component 130 of FIG. 1.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. The unit cell array 205 includes an array of unit cells. In an aspect, each unit cell may include a detector and interface circuitry. The interface circuitry of each unit cell may provide an output signal, such as an output voltage or current, in response to a detector signal (e.g., detector current, detector voltage) provided by the detector of the unit cell. The output signal may be indicative of the magnitude of EM radiation received by the detector. The column multiplexer 215, column amplifiers 220, row multiplexer 230, and data output buffer 245 may be used to provide the output signals from the unit cell array 205 as a data output signal on a data output line 250. The data output signal may be an image formed of the pixel values for the image sensor assembly 200. In this regard, the column multiplexer 215, column amplifiers 220, row multiplexer 230, and data output buffer 245 may collectively provide an ROIC (or portion thereof) of the image sensor assembly 200.

In an aspect, the column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array traverses to get to the column multiplexer 215. As another example, the column amplifiers 225 may include an ADC for converting analog signals to digital signals. These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., IR light) incident on the detectors of the unit cells.

In an aspect, the control bias and timing circuitry 235 may generate bias values, timing control voltages, and switch control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the processing component 110 and/or imaging capture component 130 of FIG. 1.

In an aspect, the image sensor assembly 200 may be implemented as part of an imaging system (e.g., 100). In addition to the various components of the image sensor assembly 200, the imaging system may also include one or more processors, memories, logic, displays, interfaces, lenses, and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as NUC, spatial and/or temporal filtering, and/or other operations.

The images (e.g., processed images) may be stored in memory (e.g., external to or local to the imaging system) and/or displayed on a display device (e.g., external to and/or integrated with the imaging sy stem).

By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz.

In some embodiments, techniques are provided for a point cloud denoising algorithm. In some aspects, such techniques may be based on aggregation of multiple anisotropic surface-adaptive local estimates computed on local coordinate systems. In some cases, the point cloud denoising may be adapted to suppress noise while preserving sharp features. In some cases, such point cloud denoising may mitigate positional errors (e.g., which can be regarded as noise) contained in three-dimensional (3D) point clouds. In this regard, in some cases, such techniques may be adapted to provide stable and accurate point cloud denoising performance, with preservation of sharp features comparable to or exceeding conventional methods, such as in cases with moderate to strong noise, while being local and computationally inexpensive.

Point cloud data, which may include collections of 3D point locations along with some other affiliated properties (e.g., colors, point orientations, etc.) discretely representing 3D scenes or objects, are used in many applications, including by way of non-limiting examples cultural heritage preservation, autonomous vehicles, and virtual reality. In some cases, these data can be the direct output of various 3D scanning devices, or can be computed from photographs taken at multiple viewpoints using photogrammetry techniques. Such adaptive procedures may be prone to errors, such as due to vibrations or scattering during the scanning process and/or because the multi-view photographs are not ideal (e.g., subject to reflections, over or under exposed, blurred, grainy). These measurement errors may result in noise corrupting the positions of the points in the cloud. To permit effective use of the acquired point clouds, noise mitigation, such as through use of various denoising techniques described herein, is generally desirable.

Point cloud denoising may be based on a moving least squares (MLS) approximation. In some cases, due to fixed circular symmetric (isotropic) weights in the MLS, an MLS approach may tend to over-smooth sharp features in the point cloud. Such an issue may be mitigated or avoided through use of anisotropic approaches, such as through use of bilateral filters for point clouds and/or through use of robust regularization of the surface normals. In some approaches, a location of sharp features may be detected, and then the noisy points on smooth areas and sharp feature regions may be addressed accordingly. A mean curvature flow technique may be employed to recognize and recover the sharp edges during filtering. In some cases, a graph structure may be built on a point cloud, converting the point cloud denoising issue to signal processing on graphs.

In some embodiments, an anisotropic denoising algorithm for point clouds may be provided based on a dense aggregation of MLS estimates defined on directional neighborhoods that may be locally adaptive to a shape of a surface underlying a point cloud. In some cases, a local polynomial approximation—intersection of confidence intervals (LPA-ICI) technique may be employed to determine (e.g., automatically determine) adaptive directional neighborhoods for each point. In some cases, using the LPA-ICI technique, largest neighborhoods in which points inside fit a desired polynomial smoothness may be identified, thus they may avoid edges and singularities and may constitute a robust adaptive support for a local MLS estimation. In an embodiment, a final estimate of the point cloud may be obtained by combining all overlapping local estimates through a regularized aggregation procedure specific for point clouds.

Figure 3C:
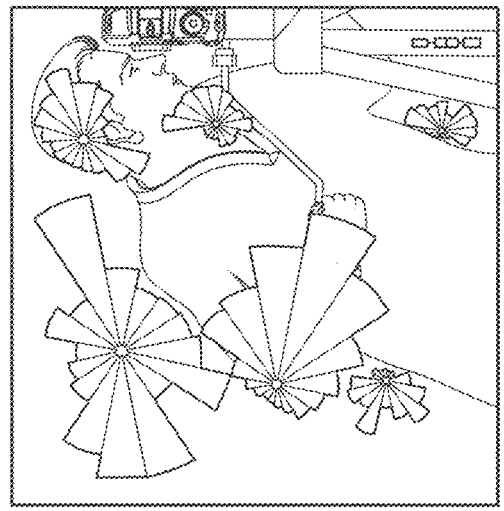
FIGS. 3B and 3C illustrate example anisotropic neighborhoods produced in a noisy Lena image and Cameraman image, respectively, in accordance with one or more embodiments of the present disclosure.
Figure 3B:
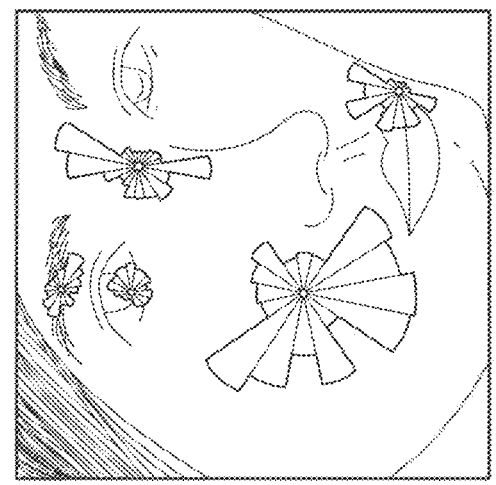
Figure 3A:
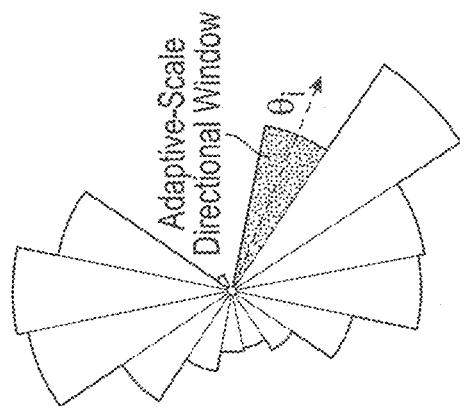
FIG. 3A illustrates an anisotropic neighborhood constructed by multiple directional windows with different sizes in accordance with one or more embodiments of the present disclosure.

It is noted that the LPA-ICI technique was originally developed for the pointwise adaptive nonparametric estimation of 1-D signals, and further developed into an adaptive anisotropic filter for images and videos. In connection with the LPA-ICI technique's design flexibility and accurate adaptation to the geometry of the image content, such as shown in FIGS. 3A-3C, LPA-ICI may be applied to image denoising and other image and video restoration tasks. FIG. 3A illustrates an anisotropic neighborhood constructed by multiple directional windows with different sizes. FIGS. 3B and 3C illustrate example anisotropic neighborhoods produced by LPA-ICI in a noisy Lena image and Cameraman image, respectively. In some cases, these properties make LPA-ICI amenable to dealing with point cloud data.

In some embodiments, example technical contributions are provided in relation to one or more of: design of anisotropic neighborhood structure with respect to the LCS, development of directional weighted order statistics (WOS) filters for filtering of LPA-ICI sizes on point clouds, aggregation strategy where an estimate (e.g., final estimate) simultaneously fits all overlapping local estimates, and/or robust noise variance estimation method for point clouds. In an aspect, LCS may refer to local coordinate system.

In some embodiments, denoising methodology may utilize the LPA-ICI. In some cases, the LPA-ICI may be more robust (e.g., compared to methods based on bilateral weights) since the LPA-ICI may be based on testing the statistical consistency of a multiscale sequence of local estimators rather than a mere similarity of individual noisy samples. As such, denoising methodology using the LPA-ICI may be more effective/robust under heavy noise. In addition, by using asymmetric directional neighborhoods for the LPA-ICI, edges and discontinuities may be adapted for using larger supports (e.g., hence stronger noise attenuation) than approaches such as MLS based on symmetric weights. In image denoising, the aggregation of the overlapping local estimates may improve the stability and quality of the estimation. As a result, techniques provided herein in accordance with one or more embodiments may achieve consistent results, with effective noise suppression and accurate preservation of sharp features.

As an example, consider a noisy point cloud $P=\{p_i, i \in [1, \ldots, I]\}$ of the form $$p_i = q_i + \eta_i, p_i, q_i, \eta_i \in \mathbb{R}^3, \quad (1)$$

where $q_i$ is a point from the unknown noise-free point cloud Q, $\eta_i \sim N(\mu, \Sigma)$ is i.i.d. (e.g., independent and identically distributed) zero-mean Gaussian white noise, with $\mu=(0,0,0)^T$ and $\Sigma=\sigma^2 1$, 1 being the 3×3 identity matrix. The (marginal) variance $\sigma^2$ is assumed as known. In some cases, when the variance is unknown, it can be estimated from P.

Each point is a 3-component column vector representing a spatial position in $\mathbb{R}^3$. The point clouds may be assumed to be discrete noisy samples of an underlying surface (2-dimensional manifold), denoted as M. As the noise is modeled as isotropic, the point-to-surface error measured along the normal to the surface also has variance $\sigma^2$.

Denoising may be used to obtain from P a point cloud $\hat{Q}=\{\hat{q}_i, i \in [1, \ldots, I]\}$ that is close to M, while not being necessarily close to Q.

In some aspects, the noise standard deviation (denoted by σ) may be estimated (e.g., for noise level estimation). Such a method for estimating the noise standard deviation extends to point clouds the approach based on the median of absolute deviation (MAD) of high-frequency subbands, which is established in image processing such as in wavelet literature. Analogous to a Haar-wavelet detail subband (e.g., first-order finite differences) a vector $d=[d_1, \ldots d_I]$ formed by the difference between adjacent points along the third dimension of the LCS can be provided, where $$d_i = \frac{z_i^{L_i} - z_t^{L_i}}{\sqrt{2}}$$

and $p_t$ is the closest point to $p_i$ along the $(x^{L_i}, y^{L_i})$-plane:

$$p_t = \underset{p_j \in P, p_j \neq p_i}{\mathrm{argmin}} \left\| (x_i^{L_i}, y_i^{L_i}) - (x_j^{L_i}, y_j^{L_i}) \right\|$$

Then, the standard deviation of the noise (denoted by σ) may be estimated as $$\hat{\sigma} = \frac{\mathrm{median}(|d|)}{0.6745}$$

FIG. 4 illustrates a flowchart of an example point cloud denoising pipeline in accordance with one or more embodiments of the present disclosure. In an aspect, LCS construction may be performed. For each point $p_i \in P$, its LCS $L_i$ may be defined as the principal axes of its K nearest neighbors (KNN or K-NN), as illustrated in FIGS. 5A-5B. In this regard, FIGS. 5A-5B illustrate computing the LCS for one point (denoted as $p_i$) in a noisy Bunny point cloud. In FIG. 5A, one point and its KNN are shown. In FIG. 5B, a zoomed-in view of the one point (denoted as $p_i$) and its KNN and the three principle axes of the LCS (shown by three lines 510, 515, and 520) are shown. One neighbor is labeled 505 in FIG. 5B. This may provide an efficient approach for LCS construction and the local normal estimation, as the third principal axis also well estimates the normal of the underlying surface at current point. The corresponding local coordinates of any point $p_m \in P$ as $p_m^{L_i} = (x_m^{L_i}, y_m^{L_i}, z_m^{L_i})^T$. The origin of $L_i$ is set at $p_i$, thus $p_i^{L_i} = (0,0,0)^T$. Further, the third principal component may be denoted as $e_i$, where $e_i^{L_i} = (0,0,1)^T$.

In an aspect, adaptive directional sizes may be provided. The anisotropic LPA-ICI may allow modeling the local smoothness of the underlying surface M with respect to different directional neighborhoods with varying sizes. As described herein, the LPA-ICI may be considered for point clouds.

An adaptive directional neighborhood structure may be provided. In case of point clouds, directional neighborhoods are subvolumes of $\mathbb{R}^3$ which are intersected with P in order to select points. Points within each directional neighborhood are treated as part of a locally smooth portion of M. Anisotropy may follow from allowing neighborhoods along different directions to have different sizes. In this regard, each neighborhood may extend anisotropically in each of a plurality of directions.

Figure 6B:
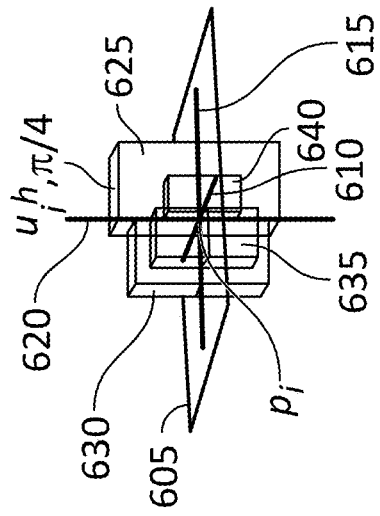
FIG. 6B illustrates the directional neighborhoods of a point $p_i$ as seen from sideways in accordance with one or more embodiments of the present disclosure.
Figure 6D:
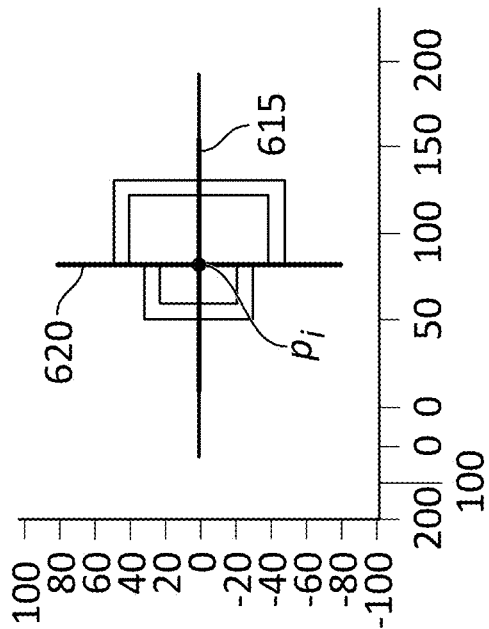
FIGS. 6C and 6D illustrate the directional neighborhoods of FIG. 6A from two additional angles.
Figure 6A:
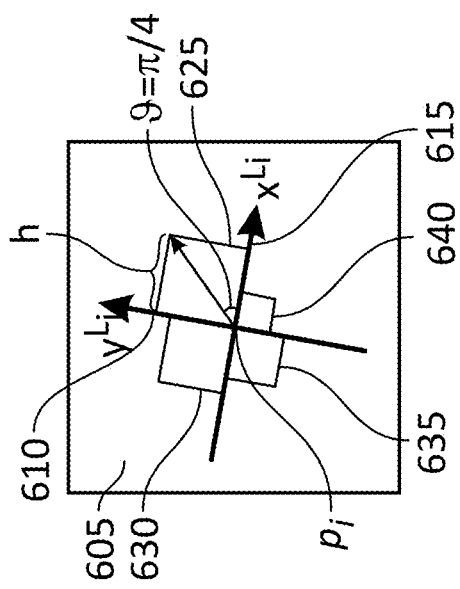
FIG. 6A illustrates directional neighborhoods of a point $p_i$ as seen from atop in accordance with one or more embodiments of the present disclosure.
Figure 6C:
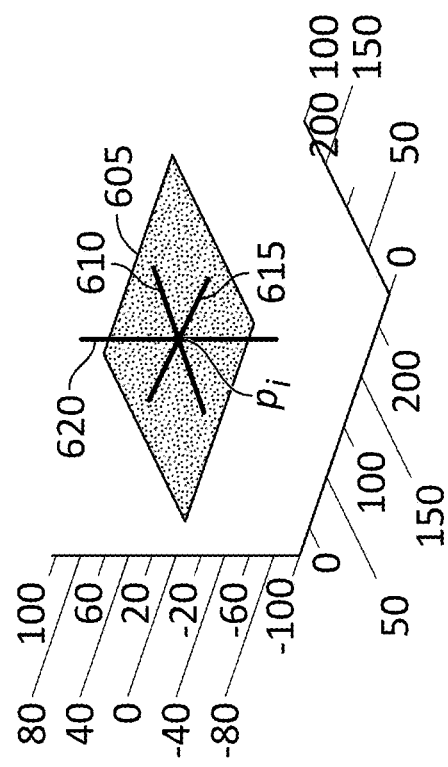

Concretely, for each $p_i$, four directional neighborhoods each within the four quadrants defined by the first two principal axes of $L_i$ may be considered. Each directional neighborhood is a right rectangular prism (e.g., rectangular prisms 625, 630, 635, and 640), as illustrated by the example in FIGS. 6A-6D. FIG. 6A illustrates the directional neighborhoods of $p_i$, as seen from atop (along the $z^{L_i}$ axis of the local coordinate system). FIG. 6B illustrates the directional neighborhoods of $p_i$, as seen from sideways (along the $z^{L_i}$ axis of the local coordinate system). Similarly, FIGS. 6C and 6D illustrate the right rectangular prism neighborhoods from two additional angles. In FIG. 6B, the arrow with angle $\vartheta = \pi/4$ indicates the direction of the neighborhood denoted by $u_{i,\pi/4}^h$. A plane 605 represents the $(x^{L_i}, y^{L_i})$-plane. Three differently colored lines (e.g., three orthogonal lines 605, 610, and 615) represent the three axes of the local coordinate system $L_i$. The base of the prism is a h×h square, where h defines the size of the directional neighborhood; the height of the prism is, by construction of $L_i$, along the normal and it is set equal to max $\{5\sigma, 2 h\}$, so that the prism is tall enough to include noisy samples from the neighborhood of $p_i$ without intersecting other portions of the manifold.

Each directional neighborhood of $p_i$ may be denoted as $u_{i,\vartheta}^h$, where $h \in \mathbb{R}^+$ is the size and $$\vartheta \in \Theta = \left[ \frac{\pi}{4}, \frac{3\pi}{4}, \frac{5\pi}{4}, \frac{7\pi}{4} \right]$$

gives direction within the $(x^{L_i}, y^{L_i})$-plane, as also shown in FIGS. 6A and 6B. Further, let $M_{i,\vartheta}^{h_j}$ be the indices of the points inside $u_{i,\vartheta}^h$, i.e. $P \cap u_{i,\vartheta}^h = \{p_m, m \in M_{i,\vartheta}^h\}$.

In an aspect, a pointwise polynomial estimate may be provided. The LPA kernels $g_{i,\vartheta}^h$ (for function estimation) are computed with respect to the coordinates $x_m^{L_i}$, $y_m^{L_i}$, $m \in M_{i,\vartheta}^h$, with uniform weights. These kernels yield a polynomial approximation of the normal elevation of M at $p_i$ with respect to $L_i$ as $$(\hat{z}_i^{L_i})_\vartheta^h = \sum_{m \in M_{i,\vartheta}^h} z_m^{L_i} g_{i,\vartheta}^h (x_m^{L_i}, y_m^{L_i}) \quad (2)$$

In an aspect, an adaptive size selection is provided. Anisotropy of the estimate entails the adaptive selection of the size of the directional neighborhood of each point and for each direction. The ICI technique may be employed for this task.

Concretely, let $H = \{h_1, \ldots, h_J\} \subset \mathbb{R}^+$ be a predefined set of increasing size and compute equation (2) for each $h \in H$, using the same fixed polynomial order for all sizes and yielding a set of estimates $$\{(\hat{z}_i^{L_i})_\vartheta^{h_1}, \ldots, (\hat{z}_i^{L_i})_\vartheta^{h_J}\}.$$

Since $M_{i,\vartheta}^h$ grows with the size h, these estimates are characterized by decreasing variance and increasing bias with h. The variance can be computed as $$\sigma^2 \| g_{i,\vartheta}^h \|_2^2,$$

whereas the bias is unknown.

The ICI rule selects from $$\{(\tilde{z}_i^{L_i})_\vartheta^{h_1}, \ldots, (\tilde{z}_i^{L_i})_\vartheta^{h_J}\}$$

an adaptive estimate $$(\tilde{z}_i^{L_i})_\vartheta^{h_{i,\vartheta}^+}$$

that facilitates optimizing the bias-variance tradeoff. In this regard, the ICI may progressively intersect the confidence intervals associated to the estimates, starting from the smallest $h_1$ and increasing the size as long as the intervals have a common non-empty intersection. The adaptive size $h_{i,\vartheta}^+$ is the largest one before the intersection is empty. The corresponding adaptive directional neighborhood is denoted as $u_{i,\vartheta}^+$. In an aspect, the LPA-ICI may allow detection of the increase of bias that results from the neighborhoods expanding over an edge or sharp features incompatible with the assumed polynomial smoothness.

Figure 7:
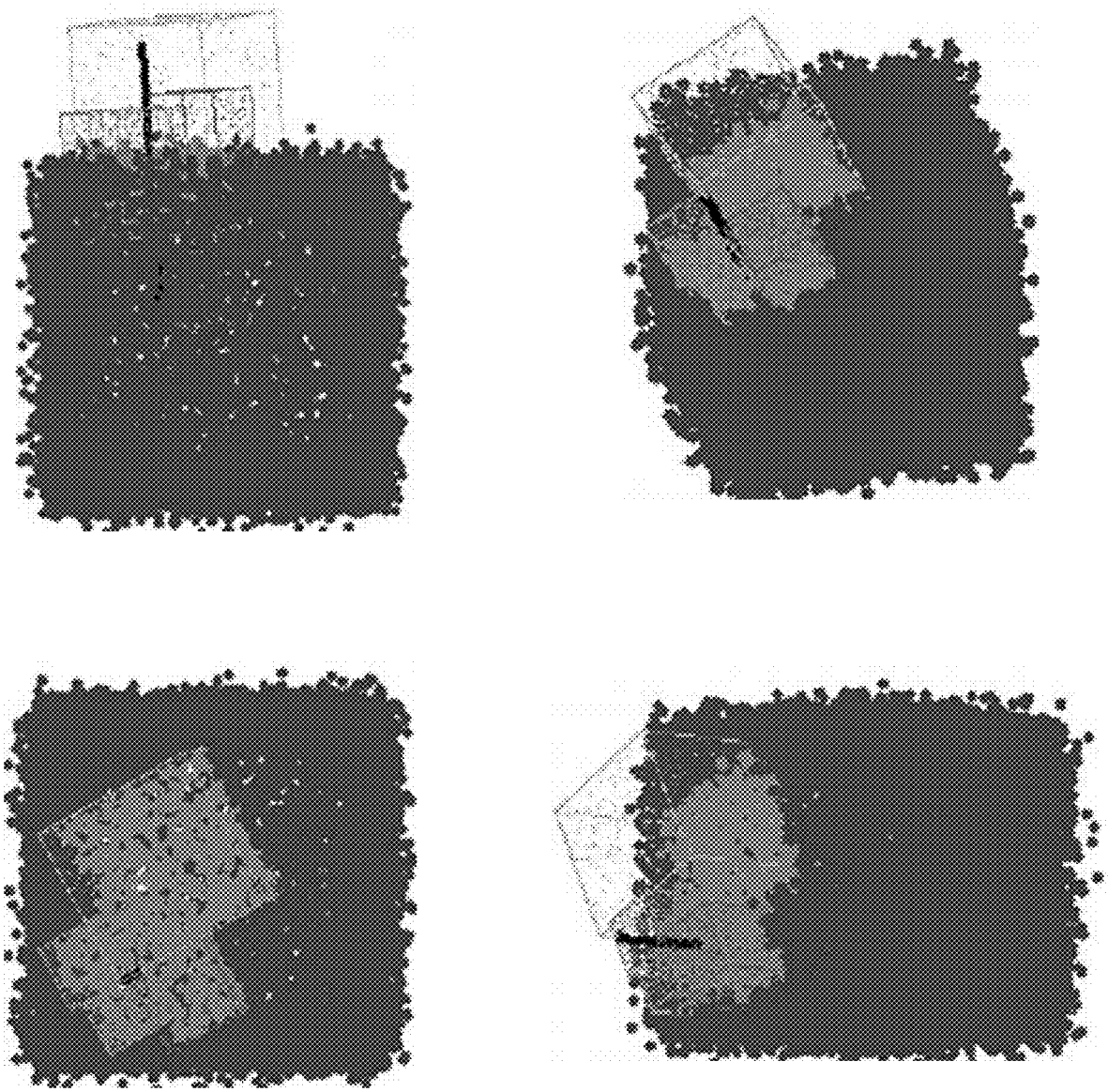
FIG. 7 illustrates an example of adaptive directional neighborhoods computed by LPA-ICI for a point in the noisy Cube point cloud, as visualized from different view angles.

FIG. 7 illustrates an example of adaptive directional neighborhoods computed by LPA-ICI from one point in a noisy point cloud of a cube, as visualized from different view angles. Points located inside the neighborhood are provided in a different color. The parameters of this point cloud, as well as of the other point clouds (e.g., described herein) in some cases, are summarized in Table I.

where $\langle \vartheta^{L_t}, \vartheta_j^{L_i} \rangle$ is the inner product between the direction $\vartheta$ in the LCS of $p_t$ and the direction $\vartheta_j$ in the LCS of $p_i$, treated as two versors in $\mathbb{R}^3$.

Figure 9:
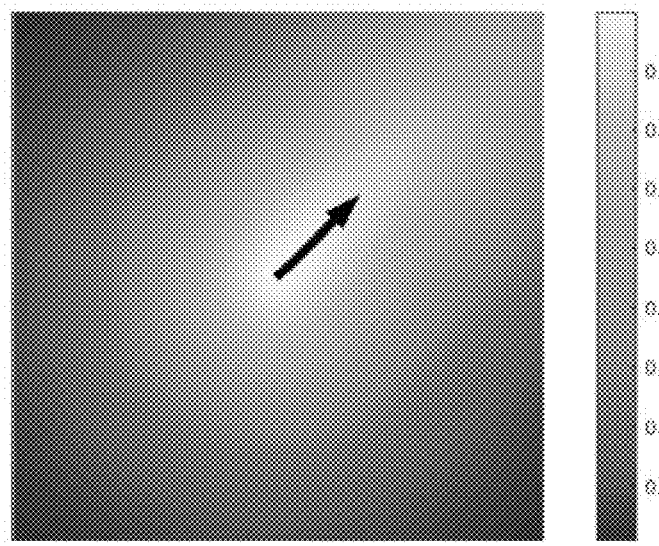
FIG. 9 illustrates a map of weights for directional WOS filtering.

Each $h_{t,\vartheta_j}^+$ enters the WOS with weights defined as function of the coordinates $x_t^{L_i}$, $y_t^{L_i}$ of the point $p_t$ in the LCS of $p_i$. FIG. 9 illustrates the distribution of weights for a direction $\vartheta_j$ as indicated by the arrow. In this regard, FIG. 9 illustrates a map of weights for directional WOS filtering. The map is defined over the $(x^{L_i}, y^{L_i})$-plane in the local coordinate system of $p_i$, and the arrow indicates the direction under consideration. Points close to $p_i$ and located in front of $p_i$ with respect to the considered direction have larger WOS weights.

Figure 10:
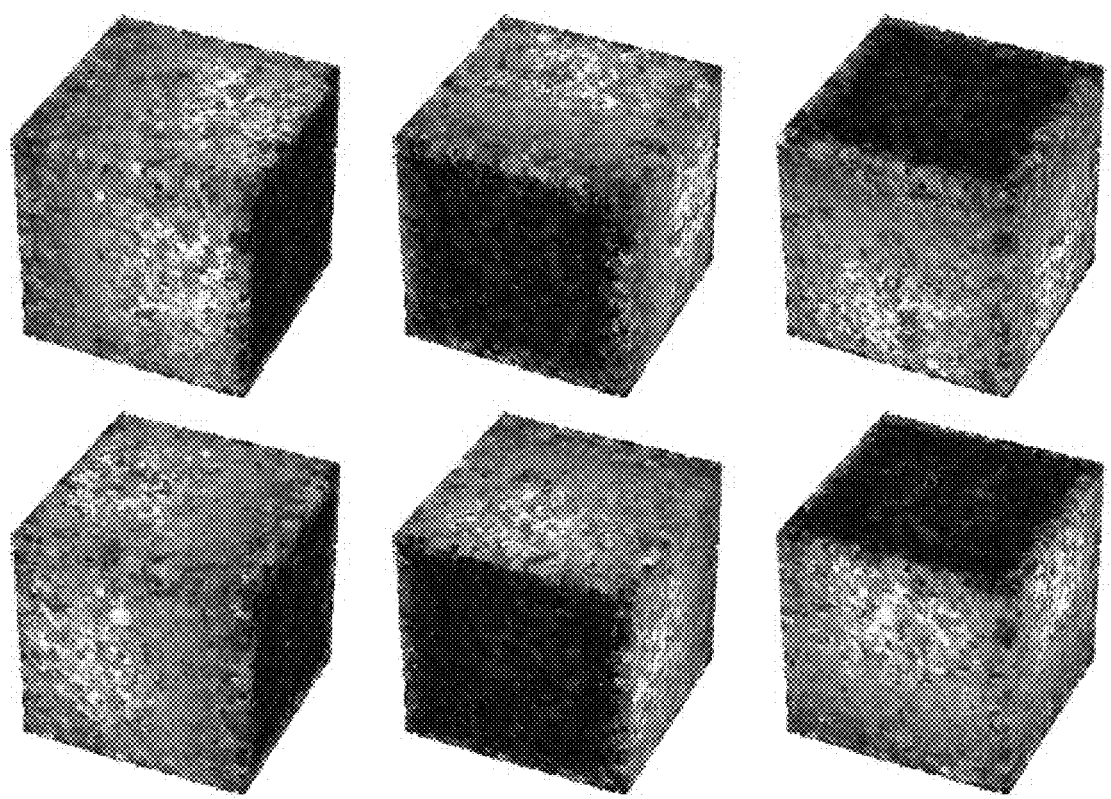
FIG. 10 illustrates that adaptive directional sizes decrease when approaching edges in accordance with one or more embodiments of the present disclosure.

As an example, the visual evaluation of the improvement in the selection of the adaptive directional sizes is given in FIGS. 8A-8D and 10. In FIG. 10, for each point in the noisy Cube point cloud, equation (3) above is used to compute its directional neighborhood size along each of the six directions parallel to the cube edges. Points with bright colors indicate large directional size, and vice versa. FIG. 10 illustrates that the adaptive directional sizes decrease when approaching edges.

After WOS, for the sake of notation, the refined directional sizes of $p_i$ are still denoted as $\{h_{i,\vartheta}^+, \vartheta \in \Theta\}$, and the corresponding directional neighborhoods are still denoted as $\{u_{i,\vartheta}^+, \vartheta \in \Theta\}$.

In an aspect, estimates with adaptive directional neighborhood size are provided. In some cases, the estimate with the adaptive directional size $h_{i,\vartheta}^+$ may be computed by

TABLE I

PARAMETERS OF THE NOISY POINT CLOUDS USED IN THE EXPERIMENTS.

| Point clouds | Cube | Bunny | Armadillo Arm | Fandisk | | |
|---|---|---|---|---|---|---|
| σ | 1.97 | 3.10 × 10⁻³ | 1.51 | 5.00 × 10⁻³ | 1.00 × 10⁻² | 2.00 × 10⁻² |
| Δ (median separation distance) | 1.07 | 1.43 × 10⁻² | 5.83 × 10⁻¹ | 1.50 × 10⁻² | 1.49 × 10⁻² | 1.71 × 10⁻² |
| diameter | 1.27 × 10² | 2.12 × 10⁻¹ | 7.27 × 10¹ | 2.52 | 2.53 | 2.56 |

Figure 8A:
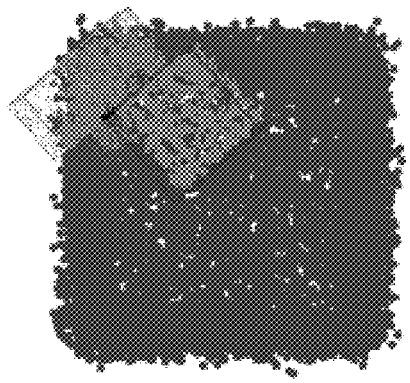
FIG. 8A illustrates an example an adaptive directional neighborhood before weighted order statistics (WOS) filtering is applied, in which neighborhood sizes achieved from LPA-ICI may have erroneously stretched the neighborhoods crossing sharp edges.
Figure 8B:
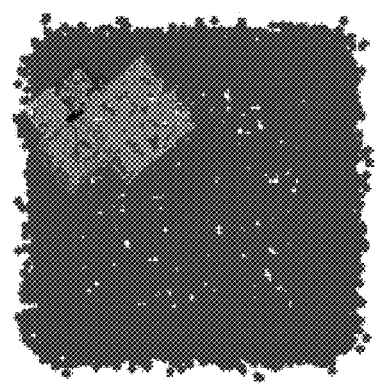
FIG. 8B illustrates the example provided in FIG. 8A after WOS filtering in accordance with one or more embodiments of the present disclosure.
Figure 8C:
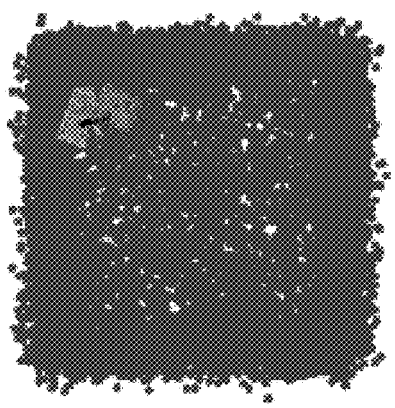
FIG. 8C illustrates an example an adaptive directional neighborhood before WOS filtering is applied, in which neighborhood sizes achieved from LPA-ICI may be small even when their borders are still far away from any sharp edges.
Figure 8D:
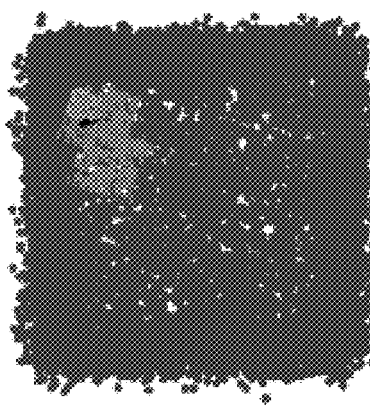
FIG. 8D illustrates the example provided in FIG. 8C after WOS filtering in accordance with one or more embodiments of the present disclosure.

In an aspect, a directional size refinement is provided. In some cases, the neighborhood sizes achieved from LPA-ICI may have deficiencies. As one example, some neighborhood sizes may erroneously stretch the neighborhoods crossing sharp edges (e.g., FIG. 8A), while some may generate small neighborhoods even when their borders are still far away from any sharp edges (e.g., FIG. 8C). A robust post-filtering of the directional adaptive LPA-ICI sizes via weighted order statistics (WOS) may be applied, as shown in FIGS. 8B and 8D. In some cases, these WOS may feature larger weights for adaptive sizes of nearer neighboring points and with similar orientation. The case of point clouds may involve complication because the directional neighborhood sizes for different points may be defined with respect to different LCSs. Thus, for a given point $p_i$ and direction $\vartheta_j$, directional sizes for a nearby point $p_t$ along $\vartheta_j$ may be provided by (e.g., defined as)

$$h_{t,\vartheta_j}^{+L_i} = \frac{\sum_{\vartheta \in \Theta} h_{t,\vartheta}^+ \max\{0, \langle \vartheta^{L_t}, \vartheta_j^{L_i} \rangle\}}{\sum_{\vartheta \in \Theta} \max\{0, \langle \vartheta^{L_t}, \vartheta_j^{L_i} \rangle\}} \quad (3)$$

equation (2), with $h_{i,\vartheta}^+$ in place of $h_j$ (e.g., since, due to equation (3), $h_{i,\vartheta}^+$ may not be in H). This estimate can be thus written with respect to the LCS of $p_i$ as $$\tilde{p}_{i,\vartheta}^{L_i} = \left(0, 0, (\tilde{z}_i^{L_i})_\vartheta^{h_{i,\vartheta}^+}\right)^T \quad (4)$$

or with respect to the canonical coordinates as $$\tilde{p}_{i,\vartheta} = p_i + (\tilde{z}_i^{L_i})_\vartheta^{h_{i,\vartheta}^+} e_i \quad (5)$$

where $e_i$ is the third principal component of the KNN of $p_i$, defining the LCS $L_i$ as previously provided.

In an aspect, an aggregated estimate is provided. For each point $p_i$, there are now four directional neighborhoods with adaptive sizes $h_{i,\vartheta}^+$, $\vartheta \in \Theta$ and corresponding estimates from equations (4)-(5). In some cases, there may be in principle three alternative approaches to estimate $\hat{q}_i$. A first approach may be to combine the four adaptive estimates (5) $\tilde{p}_{i,\vartheta}$, $\vartheta \in \Theta$. A second approach may be to define a new local estimate based on all points in the union of the four directional neighborhoods, i.e.

$$\{p_m, m \in M_{i,\vartheta}^{h_{i,\vartheta}^+}, \vartheta \in \Theta\}.$$

A third approach may be to define an aggregated estimate that simultaneously fits the many local estimates from overlapping adaptive directional neighborhoods of different points. In some cases, the first approach may be simplest but yield results insufficient for image denoising. In some cases, the second approach assumes that the four neighborhoods share a unique underlying smooth surface, which does not happen when $p_i$ is on an edge.

Figures 11A, 11B:
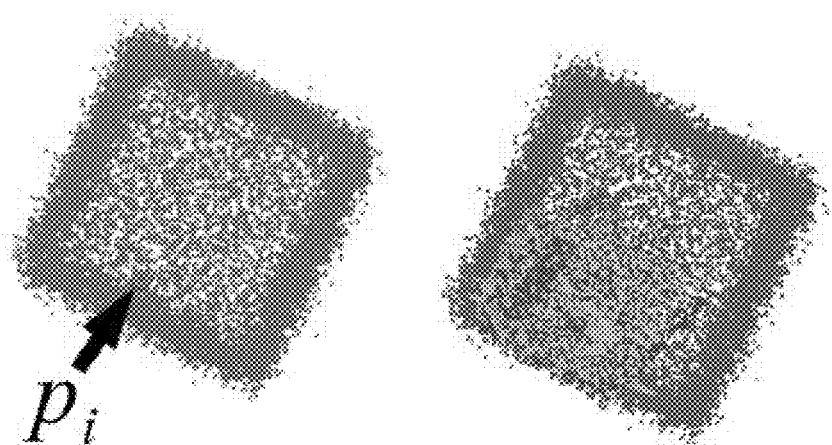
FIG. 11A illustrates a point $p_i$ in the noisy Cube point cloud.
FIG. 11B illustrates the estimated points in different colors and overlying on the noisy point cloud that are from different directional neighborhoods of different points/
Figures 11C, 11D:
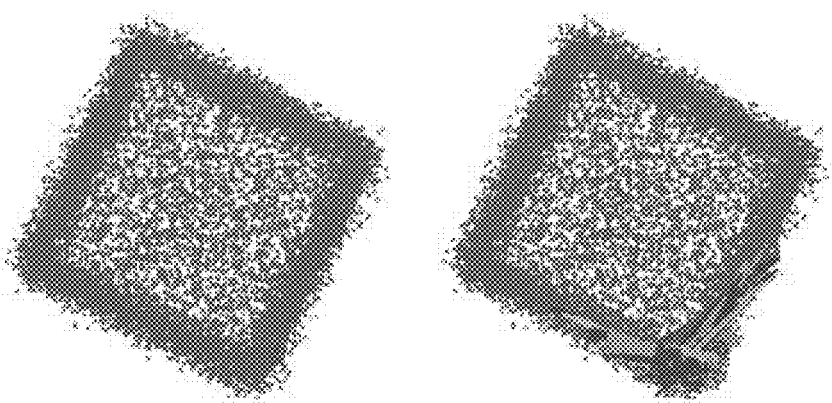
FIGS. 11C and 11D illustrate the view of FIGS. 11A and 11B from a different angle.

In some embodiments, to leverage the multiplicity of overlapping estimates for each point (e.g., FIGS. 11A-11D), the third approach may be utilized. FIG. 11A illustrates a point $p_i$ in the noisy Cube point cloud. FIG. 11B illustrates the estimated points in different colors and overlying on the noisy point cloud that are from different directional neighborhoods of different points, e.g. $\{u_{n,\vartheta}^+, (n, \vartheta) \in K_i\}$. All these neighborhoods contain $p_i$. FIGS. 11C and 11D illustrate the view of FIGS. 11A and 11B from a different angle.

In utilizing the third approach, the estimate may be defined as $$\hat{q}_i = \underset{q}{\text{argmin}}\left(\sum_{(n,\vartheta)\in K_i} w_{n,\vartheta}^2 d^2(q, \tilde{M}_{n,\vartheta}^+) + \lambda^2\sigma^{-2}\|q - p_i\|^2 \sum_{(n,\vartheta)\in K_i} w_{n,\vartheta}^2\right) \quad (6)$$

where $K_i$ provides the point and direction indices $(n, \vartheta)$ of any adaptive directional neighborhood $u_{n,\vartheta}^+$ containing $p_i$, $\tilde{M}_{n,\vartheta}^+$ is the polynomial surface fitted by the LPA on the adaptive directional neighborhood $u_{n,\vartheta}^+$, d is the point-to-surface distance, $\lambda > 0$ is the regularization parameter, and $w_{n,\vartheta}^2 = \varepsilon_{n,\vartheta}^{-2}$ are weights inversely proportional to the average quadratic fit of the surface to the data $$\varepsilon_{n,\vartheta}^2 = \left|M_{n,\vartheta}^{h_{n,\vartheta}^+}\right|^{-1} \sum_{m\in M_{n,\vartheta}^{h_{n,\vartheta}^+}} d^2(p_m, \tilde{M}_{n,\vartheta}^+)$$

with $$\left|M_{n,\vartheta}^{h_{n,\vartheta}^+}\right|$$

being the number of points included in $u_{n,\vartheta}^+$.

In some cases, the first addend in equation (6) may promote estimates $\hat{q}_i$ that are close to the polynomial surfaces fitted within adaptive neighborhoods that contain the noisy point $p_i$. In an aspect, estimates $\hat{q}_i$ may be referred to as image estimates. Since the point-to-surface distance is measured along the surface normals, minimization of the first addend alone may elicit large drifts of the estimates along directions tangential to the surfaces. The second addend in equation (6) is a quadratic regularization term that prevents such large drifts. The weights $w_{n,\vartheta}^2$ give more importance to surfaces $\tilde{M}_{n,\vartheta}^+$ that may have a better fit to the data in their own adaptive neighborhood.

In an order-1 case, an order-1 LPA may be utilized. For order-1 LPA, the surfaces $\tilde{M}_{n,\vartheta}^+$ are flat planes. Each of these planes is characterized by the point $\tilde{p}_{n,\vartheta}$ which lies within the plane, and by the vector normal to the plane (denoted as $v_{n,\vartheta}$). In some cases, computing the normal vector $v_{n,\vartheta}$ is equivalent to computing the gradient of the plane, and this can be estimated by equation (2), using LPA kernels for estimation of the partial derivatives in place of the LPA kernels for estimation of the function. In this case, equation (6) becomes $$\hat{q}_i = \underset{q}{\text{argmin}}\left(\sum_{(n,\vartheta)\in K_i} w_{n,\vartheta}^2(\langle q - \tilde{p}_{n,\vartheta}, v_{n,\vartheta}\rangle)^2 + \lambda^2\sigma^{-2}\|q - p_i\|^2 \sum_{(n,\vartheta)\in K_i} w_{n,\vartheta}^2\right)$$

which is quadratic on q and can be solved by zeroing the gradient as $$\sum_{(n,\vartheta)\in K_i} w_{n,\vartheta}^2 v_{n,\vartheta}\langle \hat{q}_i - \tilde{p}_{n,\vartheta}, v_{n,\vartheta}\rangle + \frac{\lambda^2}{\sigma^2}(\hat{q}_i - p_i) \sum_{(n,\vartheta)\in K_i} w_{n,\vartheta}^2 = 0$$

i.e., $$\sum_{(n,\vartheta)\in K_i} w_{n,\vartheta}^2(v_{n,\vartheta}\langle \hat{q}_i, v_{n,\vartheta}\rangle + \lambda^2\sigma^{-2}\hat{q}_i) = $$
$$\sum_{(n,\vartheta)\in K_i} w_{n,\vartheta}^2(v_{n,\vartheta}\langle \tilde{p}_{n,\vartheta}, v_{n,\vartheta}\rangle + \lambda^2\sigma^{-2}p_i)$$

which using matrix-vector notation becomes $A\hat{q}_i = b$, where $$A = \Sigma_{(n,\vartheta)\in K_i} w_{n,\vartheta}^2(v_{n,\vartheta}v_{n,\vartheta}^T + \lambda^2\sigma^{-2}1)$$

$$b = \Sigma_{(n,\vartheta)\in K_i} w_{n,\vartheta}^2(v_{n,\vartheta}v_{n,\vartheta}^T\tilde{p}_{n,\vartheta} + \lambda^2\sigma^{-2}p_i)$$

Thus, $\hat{q}_i$ can be obtained by left matrix division of the 3×3 matrix A into the vector b. In some cases, this approach may be efficient since it does not involve storing in memory the multiple estimates for $(n, \vartheta) \in K_i$, as these are progressively aggregated into the A and b buffers.

If $$\left|M_{n,\vartheta}^{h_{n,\vartheta}^+}\right| < 3,$$

the local estimate may naturally be discarded, as the plane $\tilde{M}_{n,\vartheta}^+$ and its normal $v_{n,\vartheta}$ could not be defined. For the order-1 case, it can be empirically found that the weights $$w_{n,\vartheta}^2 = \min\left\{\left(\varepsilon_{n,\vartheta}^2 - \frac{3\sigma^2}{4}\right)^{-1}, \frac{1}{\sqrt{2}\sigma^2}\left|M_{n,\vartheta}^{h_{n,\vartheta}^+}\right|^{\frac{1}{2}}\right\}$$

yields better results, as these weights balance the fit error with the variance error due overfit given few samples in the neighborhood. In an aspect, experiments described below are based on the order-1 case.

To validate accuracy and desirable aspects of denoising algorithms, in accordance with one or more embodiments, experiments can be performed. The parameters of the point clouds used for validation are provided above in Table 1. The results presented herein are obtained using the following parameters:

ICI threshold $\Gamma=0.5$;

KNN $K=100$;

LPA scale set $H=\{0, 3\Delta(\sqrt{2})^0, 3\Delta(\sqrt{2})^1, 3\Delta(\sqrt{2})^2, \ldots, 3\Delta(\sqrt{2})^6\}$, where $\Delta$ is the median separation distance of the considered point cloud. The regularization parameter $\lambda$ in equation (6) is set to 0.1.

Figure 12A:
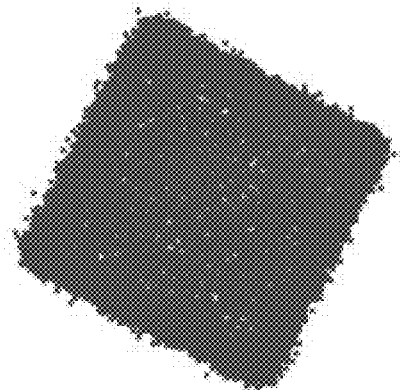
FIG. 12A illustrates a noisy Cube point cloud.
Figure 12B:
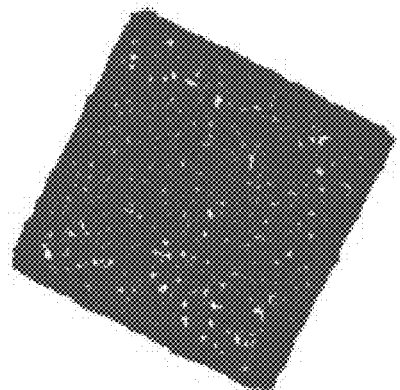
FIG. 12B illustrates a denoised result of FIG. 12A by performing denoising in accordance with one or more embodiments of the present disclosure.
Figure 12C:
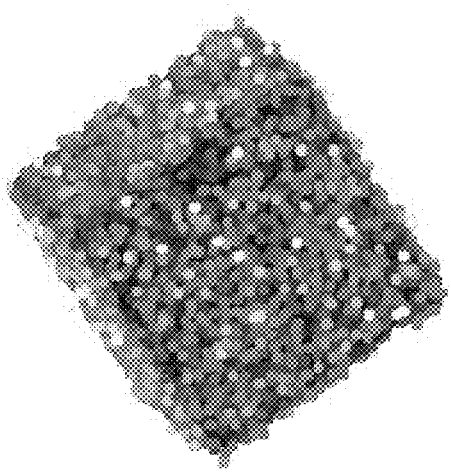
FIGS. 12C and 12D provide the same point clouds of FIGS. 12A and 12B, with each point having a color indicating its point-to-surface distance.
Figure 12D:
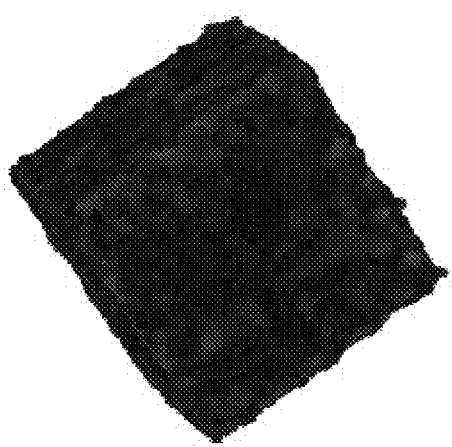

Visual and quantitative denoising results are provided herein. For the quantitative results, the point-to-surface distance may be computed based on the ground-truth point cloud. This point-to-surface distance is represented by colors in FIGS. 12A-12D, where brighter colors indicate larger distances and vice versa. FIG. 12A illustrates a noisy Cube point cloud. FIG. 12B illustrates a denoised result of FIG. 12A by performing denoising in accordance with one or more embodiments of the present disclosure. FIGS. 12C and 12D provide the same point clouds of FIGS. 12A and 12B, with each point having a color indicating its point-to-surface distance.

In FIG. 12B, it can be seen that the edges and corners of the denoised Cube point could are well recovered even when the noisy ratio is very high as in FIG. 12A. In utilizing the denoising methods in accordance with embodiments, consistently good performance of the point-to-surface distances on both smooth areas and sharp edge regions may be provided, as indicated by the uniformly allocated dark colors in FIG. 12D. In this example, the average point-to-surface distances before and after denoising are 1.5365 and 0.3281, respectively.

FIGS. 13A-13D illustrate the performance of the denoising methods presented herein when denoising the point clouds with complex shapes and/or heavy corruption. In particular, FIG. 13A illustrates an example noisy Bunny point cloud. FIG. 13B illustrates a denoised result of the Bunny point cloud after applying denoising in accordance with one or more embodiments of the present disclosure. FIG. 13C illustrates an example noisy Armadillo Arm point cloud. FIG. 13D illustrates a denoised result of the Armadillo Arm point cloud after applying denoising in accordance with one or more embodiments of the present disclosure.

From the results, it can be seen that the denoising techniques maintains the capability to recover the fine features in the point clouds, such as the thin ear parts of the Bunny point cloud in FIG. 13B, and the fine edge features (emphasized by the box) in FIG. 13D. The average point-to-surface distances before and after denoising are $2.38 \times 10^{-3}$ and $8.11 \times 10^{-4}$ for Bunny, and 1.13 and 0.41 for Armadillo Arm.

A comparison to other algorithms, including other point cloud denoising algorithms, may be provided. The compared algorithms include an MLS method (e.g., a classical MLS method), a Bilateral filter, an RIMLS, and a graph-based regularization algorithm. In an example, the MLS method may be implemented using the Point Cloud Library (PCL), source codes may be applied for bilateral filtering of point clouds, RIMLS algorithm may be implemented by using a corresponding integrated function in the Meshlab software, and source codes associated with the graph-based regularization algorithm were used. In some cases, the parameters associated with these algorithms may be carefully tuned, such as to balance the trade-off between noise reduction and feature preservation.

The Fandisk point clouds with different noise levels are utilized in the comparison. To facilitate assessment of denoising performance, surfaces for the noisy and denoised point clouds are constructed and provided in FIGS. 14A-14E. FIG. 14A illustrates reconstructed 3D surfaces of noisy Fandisk point clouds, with $\sigma$ equal to 0.005 (topmost of column), 0.01 (middle of column), and 0.02 (bottom of column). FIGS. 14B, 14C, 14D, and 14E illustrate 3D surfaces of the denoised results of FIG. 14A by applying MLS, bilateral, RIMLS, and graph-based regularization, respectively. FIG. 14F illustrates 3D surfaces of the denoised results of FIG. 14A by applying denoising in accordance with one or more embodiments of the present disclosure.

As shown in comparing FIG. 14F to each of FIGS. 14B-14E, denoising methods in accordance with embodiments may maintain the sharp edges well as well as recovering (e.g., maximally recovering) the smooth areas. Other methods may oversmooth the edges (e.g., FIG. 14B) and/or do not denoise well the smooth regions (e.g., FIGS. 14C-14E).

The point-to-surface distances of the noisy and denoised point clouds in FIGS. 14A-14F are presented by colors in FIGS. 15A-15F, respectively. In this regard, the color of each point indicates its point-to-surface distance. In some cases, with the colors, results that may appear good in FIGS. 14B-14E may not be good with respect to the point-to-surface distances. For example, the result from the graph-based regularization method shown in the top row of FIG. 14E has a corresponding point-to-surface plot that indicates the graph-based regularization method does not recover the sharp edge features well. As shown in the bottom row of FIG. 15E, the graph-based regularization method may also have issues pertaining to point-clustering.

In an aspect, quantitative denoising results of the various methods are presented in Table II.

TABLE II

AVERAGE POINT-TO-SURFACE DISTANCE FOR NOISY AND DENOSIED FANDISK POINT CLOUDS USING MLS, BILATERAL, RIMLS, GRAPH-BASED REGULARIZATION AND THE PROPOSED ALGORITHMS.

| Fandisk with $\sigma=$ | Average point-to-surface distance | | | | | |
|---|---|---|---|---|---|---|
| | Noisy | MLS [6] | Bilateral [7] | RIMLS [9] | Graph-based [15] | Proposed |
| $5.00 \times 10^{-3}$ | $3.98 \times 10^{-3}$ | $1.96 \times 10^{-3}$ | $2.04 \times 10^{-3}$ | $2.89 \times 10^{-3}$ | $2.75 \times 10^{-3}$ | $1.28 \times 10^{-3}$ |
| $1.00 \times 10^{-2}$ | $7.77 \times 10^{-3}$ | $3.04 \times 10^{-3}$ | $3.44 \times 10^{-3}$ | $3.14 \times 10^{-3}$ | $3.27 \times 10^{-3}$ | $2.48 \times 10^{-3}$ |
| $2.00 \times 10^{-2}$ | $1.54 \times 10^{-2}$ | $5.51 \times 10^{-3}$ | $7.08 \times 10^{-3}$ | $5.83 \times 10^{-3}$ | $6.22 \times 10^{-3}$ | $5.04 \times 10^{-3}$ |

In this regard, for each method with different input Fandisk point clouds, the average point-to-surface distance of the output point cloud is presented in Table II. It can be seen that denoising methods in accordance with one or more embodiments achieves the best denoising performance among the methods, with the smallest average point-to-surface distances for all three input Fandisk point clouds of different noise levels.

Thus, in one or more embodiments, point cloud denoising systems and methods are provided. In some aspects, such point cloud denoising may be based on an aggregation of multiple MLS surfaces computed on directional neighborhoods that are locally adaptive to the shape of the underlying surface of the point cloud. In one example, the LPA-ICI technique, together with a WOS filter (e.g., a robust WOS filter), may be performed with respect to the LCS of each point to achieve is adaptive directional neighborhood sizes. A dense aggregation of one point's overlapping local estimates from different adaptive directional neighborhoods may then be implemented to obtain a stable and accurate final estimate of current point. Due to the adaptive design associated with the point cloud denoising methodology presented herein, the denoising reduces the noise while preserving fine features and sharp edges in a point cloud.

Figure 16A:
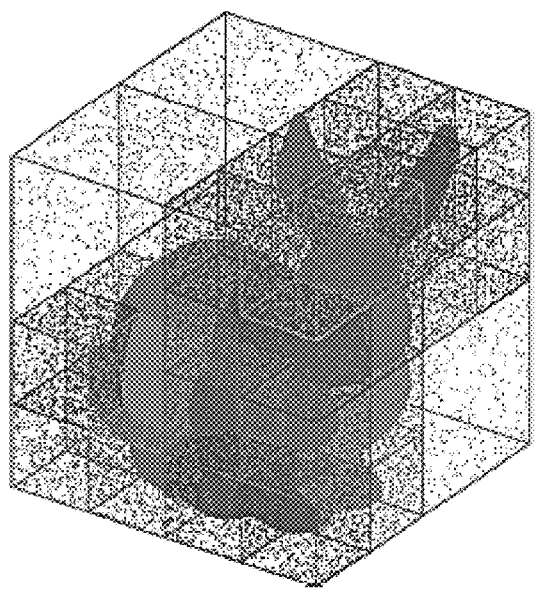
FIG. 16A illustrate an example of applying an octree-structure partitioning without overlapping on the Bunny point cloud.
Figure 16B:
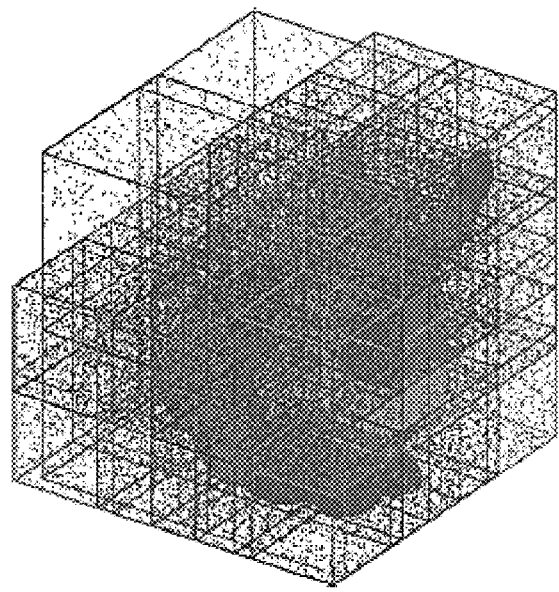
FIG. 16B illustrate an example of applying an octree-structure partitioning with overlapping on the Bunny point cloud.

In some cases, additional features may be provided for the point cloud denoising methodology. As examples, a preprocess of outlier removal and/or partitioning operator when dealing with a big point cloud data may be provided. For the partitioning operator, octree structure can be used with or without overlapping areas (e.g., see FIGS. 16A-16B). In this regard, FIGS. 16A and 16B illustrate examples of applying an octree-structure partitioning on the Bunny point cloud without overlapping and with overlapping. In some cases, by applying the partitioning operator, the sub point cloud in each leaf of the octree can be processed independently, and be implemented using parallel computing.

Figure 17:
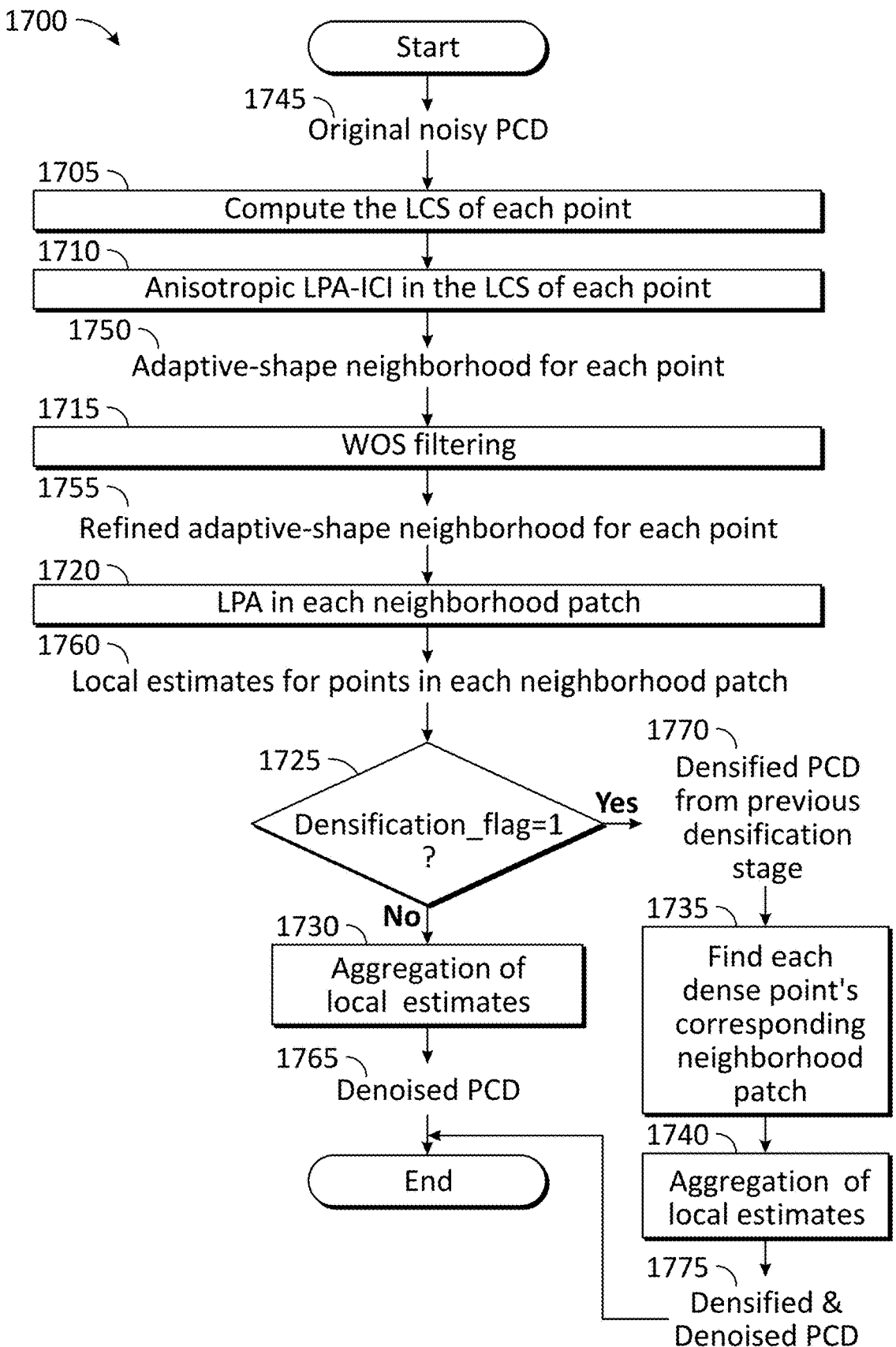
FIG. 17 illustrates a flowchart of an example process for facilitating point cloud denoising in accordance with one or more embodiments.

FIG. 17 illustrates a flowchart of an example process for facilitating point cloud denoising in accordance with one or more embodiments. The blocks of example process are described herein as occurring in serial, or linearly (e.g., one after another). However, multiple blocks of example process may occur in parallel. In addition, the blocks of example process need not be performed in the order shown and/or one or more of the blocks of example process need not be performed. In an embodiment, the processing component 110 of FIG. 1 may be utilized to perform the example process of FIG. 17.

Figure 18A:
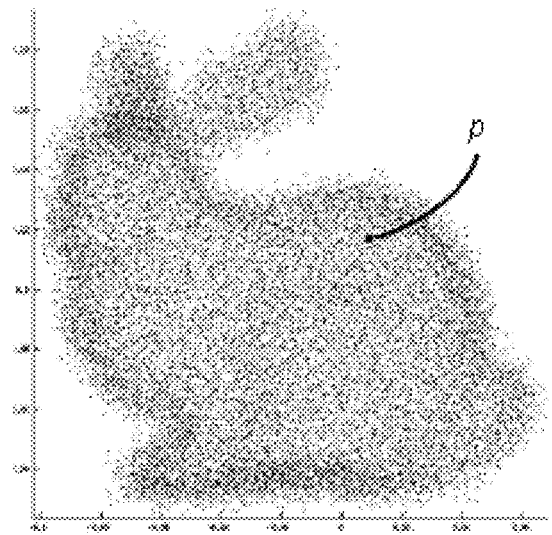
FIG. 18A illustrates the LCS of one point in the Bunny point cloud.
Figure 18B:
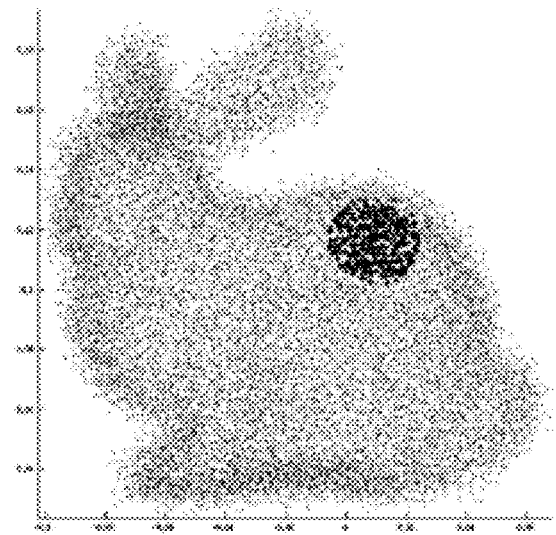
FIG. 18B illustrates the KNN associated with the Bunny point cloud.
Figure 18C:
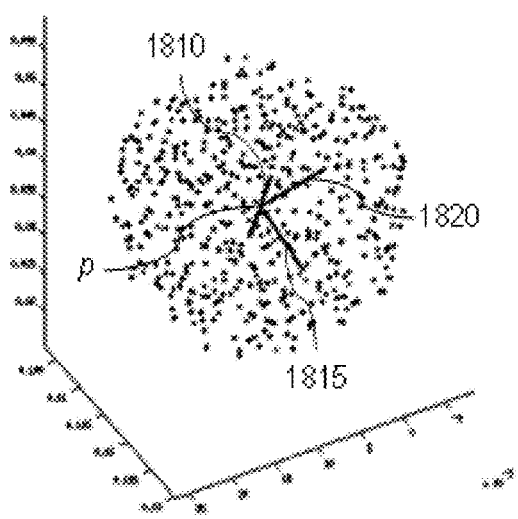
FIGS. 18C and 18D illustrate a zoomed-in view from different angles of the KNN illustrated in FIG. 18B.
Figure 18D:
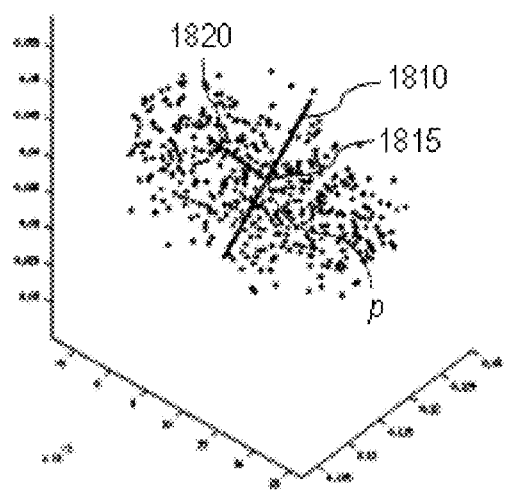

In the process, an original (e.g., initial) noisy point cloud (PCD) 1745 is provided. In an embodiment, the noisy point cloud 1745 may be a point cloud 2445 of FIG. 24. At block 1705, an LCS is computed for the noisy point cloud 1745. In an aspect, the LCD is computed for each point to facilitate use with LPA-ICI, as LPA-ICI is computed based on the LCS of each point. An example of computing the LCS of one point in the Bunny point cloud is shown in FIGS. 5A and 18A. In FIG. 18A, the single point is denoted as p. FIG. 18B illustrates KNN 1805 of the single point p in the Bunny point cloud of FIG. 18A. It is noted that the solid ellipse around the KNN 1805 in FIG. 18B is provided to identify the KNN 1805 and is not part of the Bunny point cloud. FIG. 18C illustrates a zoomed-in view of the KNN illustrated in FIG. 18B. FIG. 18D illustrates another zoomed-in view of the KNN illustrated in FIG. 18B from a different angle than FIG. 18C. Coordinates of the LCS of a point p may be denoted as $X_{LCS}^p$, $Y_{LCS}^p$, and $Z_{LCS}^p$, respectively. Lines 1810, 1815, and 1820 of FIGS. 18C and 18D represent coordinate directions of the LCS.

A parameter (denoted as gam) may be used to define the size of the KNN for computing the LCS. In one case, the current value of the parameter may be set to 100 based on empirical observations. It is noted that, in some cases, a small value for the parameter may increase the impact of the noise on computing the LCS and thus increase the variance of the estimate of the normal of a local surface (e.g., line 1810 of FIGS. 18C and 18D). A larger value for the parameter may take larger KNN areas that may cover several surfaces with different normals, reducing the variance but increasing the bias of the estimate of the normal of the surface, thus selecting an incorrect LCS to represent the surface.

At block 1710, an LPA-ICI approach (e.g., anisotropic LPA-ICI approach) is used to obtain an adaptive-shape neighborhood of each point (denoted as 1750). In an aspect, an adaptive-shape neighborhood may be constructed as follows: each point has four neighborhoods of right rectangular prism shape; each rectangular prism has equal length and width (i.e., square shape) along the $X_{LCS}^p$-$Y_{LCS}^p$ plane (whose length/width is denoted as L), and the height along $Z_{LCS}^p$ direction is 2 L (i.e., half of the height is located in each side of the $X_{LCS}^p$-$Y_{LCS}^p$ plane). An example of structure of the adaptive-shape neighborhood is shown in FIGS. 6A-6D. Lines 610, 615, and 620 represent $X_{LCS}^p$, $Y_{LCS}^p$, and $Z_{LCS}^p$, respectively. Utilizing the LPA-ICI approach, L may be determined for each point. Another example of the adaptive-shape neighborhood of one point on the noisy cube point cloud is presented in FIG. 7.

A set of L values for each direction of the neighborhood may be pre-selected. During LPA-ICI, iterations may be performed to test each L and choose the optimized L based on the ICI rule. Various parameters may be used to computer the set of L values. The parameters may include a start_scale parameter, a steps parameter, and a dim_inc_times parameter. In some cases, $L_k$=scale_in_use×(start_scale+steps$^k$), 0≤k≤dim_inc_times, where scale_in_use is a unit parameter later described herein. As an example setting, start_scale=3, steps=√2, and dim_inc_times=6. With this setting, the set of L may be [0, 4, 4.4142, 5, 5.8284, 7, 8.6569, 11]×scale_in_use. The first value may be 0, as ICI may be empty from the first test. Another parameter is a threshold value (denoted as gam) used in the ICI rule. A smaller value for this parameter may produce smaller neighborhoods, and thus less smoothing. A larger value for this parameter may generate bigger neighborhoods, and thus smoother results.

At block 1715, a WOS filter is applied after LPA-ICI to obtain a refined adaptive-shape neighborhood for each point (denoted as 1755). In an aspect, the WOS filter may reduce the impact of the randomness of the noise on the adaptive neighborhood scales, and thus improve efficiency of the ICI rule. During WOS filtering, the neighborhood scales of one point's nearest eight points are used as the input for a weighted median operation, outputting refined neighborhood scales for the current center point. The weights may be determined by the locations of the neighboring points with respect to the center point (e.g., the distances and the directions). Examples of the neighborhood scales before and after WOS filtering are presented in FIGS. 8A-8D. These figures show that the WOS filtering operation may fix some incorrect neighborhood scales after the LPA-ICI approach, including overgrown neighborhoods (e.g., FIG. 8A) and under-grown neighborhoods (e.g., FIG. 8C).

The refined adaptive neighborhood scales after WOS filtering are used for a subsequent aggregation step. A visual evaluation to assess the efficiency of the ICI rule and to check the behavior of the adaptive neighborhood scales is made and presented in FIG. 10. Decomposed neighborhood scales for all points on a cube point cloud along six directions are indicated by "hot" colors in FIG. 10. Points with bright color have big neighborhood scales, while those with dark colors have small scales. Along a certain direction, the points far away from the edges tend to have larger scales than those closer to the edge. In this regard, the LPA-ICI approach prevents the neighborhood windows to go over the edges and over-smooth edge features in a point cloud.

After calculating the scales for the four neighborhoods of each point based on original noisy points, the process 1700 proceeds to block 1720. At block 1720, an LPA (e.g., first order LPA) is applied to the points in each single neighborhood (e.g., this LPA estimate is denominated as a patch) to get estimates for the points in each neighborhood patch (denoted as 1760). For one point, it may have several estimates from different neighborhood patches. For instance, a point (denoted as $p_i$) in a noisy cube point cloud, shown in FIG. 11A, has more than 400 patches covering it (e.g., these patches are shown in FIGS. 11B-11D with different colors).

At block 1725, a determination is made as to whether densification is activated. In an aspect, the determination may be made by checking a value of a flag. For example, a densification flag value may be set such that a flag value of 1 is indicative of densification being activated and a flag value of 0 is indicative of densification being deactivated. If the determination is that densification is not activated, the process 1700 proceeds to block 1730. At block 1730, local estimates are aggregated to obtain a denoised point cloud (denoted as 1765). In an aspect, the local estimates for the point $p_i$ may be aggregated as follows:

$$\hat{p} = \underset{q}{\operatorname{argmin}} \left( \sum_{i=1}^{m} w_i^2 \|(p - a_i) \cdot \vec{n}_i\|_2^2 + \phi^2 \|p - q\|_2^2 \times \sum_{i=1}^{m} w_i^2 \right) \quad (7)$$

where m is the number of patches that contain an estimate of q, $a_i$ is a point in the $i^{th}$ patch, and $\vec{n}_i$ is the normal vector of the $i^{th}$ patch.

Then, $\|(p-a_i)\cdot\vec{n}_i\|_2^2$ is used to compute square of the distance from a point p to the $i^{th}$ patch, while $\|p-q\|_2^2$ denotes square of the distance between p and q. Equation (7) for $\hat{p}$ will find the point p that minimizes the weighted distances to all the m patches and is close to the point q. The resulting point $\vec{p}$ may be used as the final estimate for the point q. In one case, the weight $w_i$ may be determined by the mean squared error (MSE) of each neighborhood patch estimation for the noisy points. For example, more concretely, if the $i^{th}$ neighborhood patch fits well the local noisy points (e.g., it has a small MSE), $w_i$ will be big. If the $i^{th}$ path does not fit well, the local points, $w_i$ will be small. $\phi$ is a fidelity parameter to adjust the impact of the second term of equation (7). In this case, the final output point cloud is denoised.

Examples of denoising results after aggregation are presented in FIGS. 12A-12D and 13A-13D. Heat plots in FIGS. 12A-12D represent the distances between the point clouds and the ground truth. Brighter color indicates bigger distance, while darker color indicates smaller distance. As shown in FIG. 12B, shape edges of the cube point cloud are well restored. Also, in FIG. 12D, the points on the edges and corners have similar colors to those on the smooth areas, indicating consistent performance both on smooth areas, edges and corners.

If the determination is that densification is activated, the process 1700 proceeds from block 1725 to block 1735. The scales for the four neighborhoods of each point are computed based on the original noisy points. At block 1735, the adaptive neighborhood patches are mapped to a densified point cloud (denoted as 1770) by finding each dense point's corresponding neighborhood patch, resulting in more points inside each patch. In this regard, the local estimates obtained at block 1760 are associated with the densified point cloud. The densified point cloud is a densified version of the noisy point cloud 1745. In an embodiment, the densified point cloud may be obtained at block 2435 of FIG. 24. For each densified point, a local estimate may be determined using equation (7). At block 1740, the local estimates are aggregated to obtain a densified and denoised point cloud (denoted as 1775). The description of block 1730 generally applies to block 1740. In this case, the final output point cloud is denoised and densified.

Figure 19A:
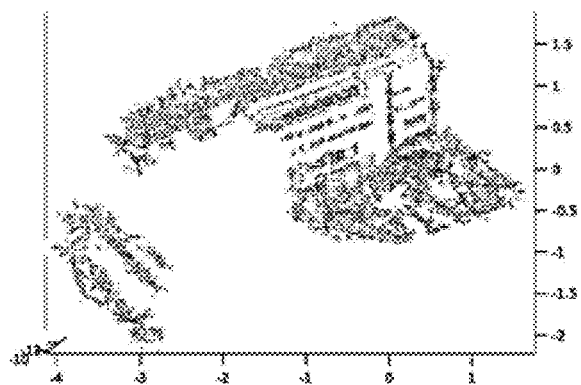
FIGS. 19A, 19C, and 19E illustrate examples of noisy point clouds of a building.
Figure 19B:
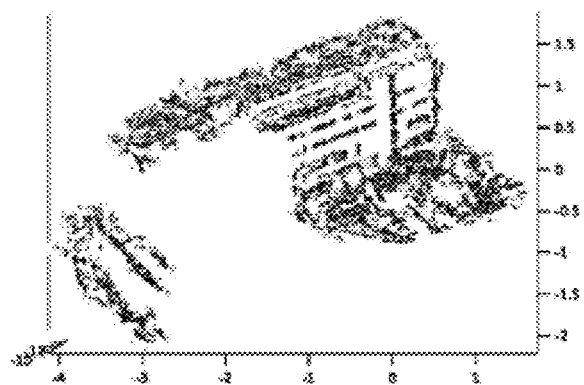
FIGS. 19B, 19D, and 19F illustrate examples of denoised and densified point clouds corresponding to the point clouds of FIGS. 19A, 19C, and 19E, respectively, in accordance with one or more embodiments.
Figure 19C:
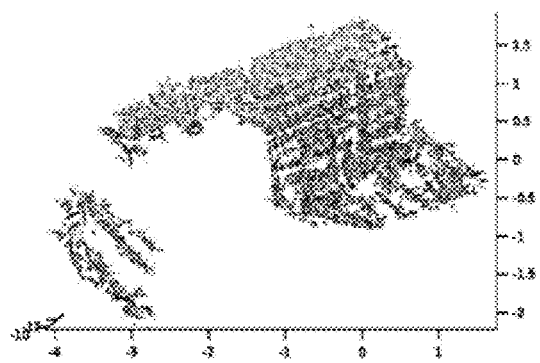
Figure 19D:
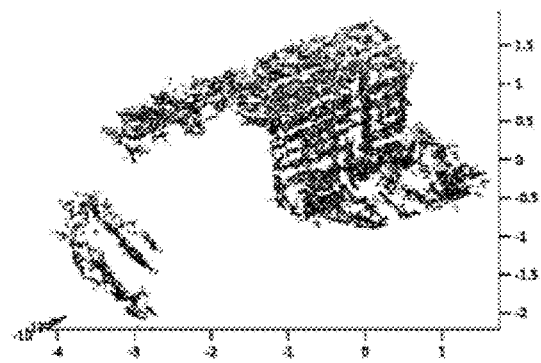
Figure 19E:
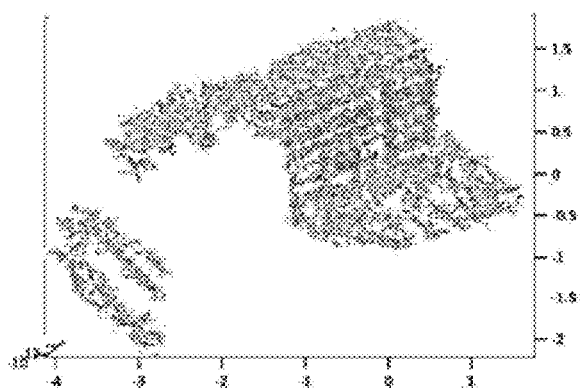
Figure 19F:
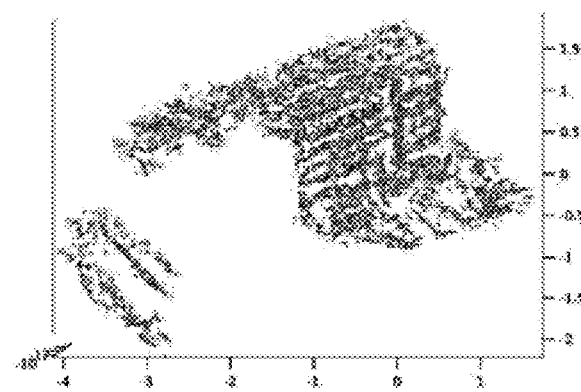
Figure 20A:
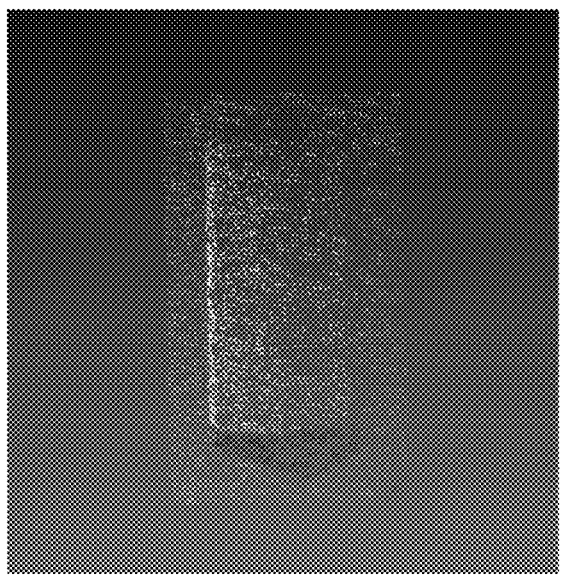
FIG. 20A illustrates a noisy point cloud of a greenhouse.
Figure 20B:
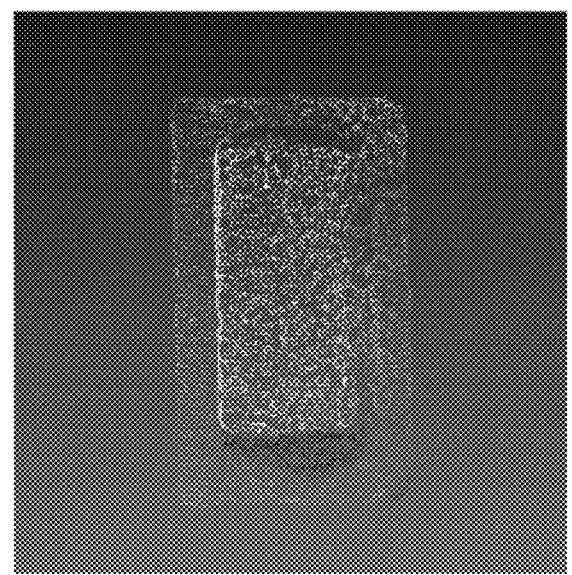
FIG. 20B illustrates a denoised and densified point cloud corresponding to the point cloud of FIG. 20A in accordance with one or more embodiments of the present disclosure.
Figure 20C:
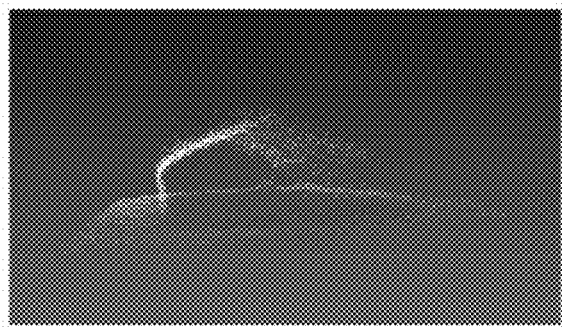
FIG. 20C illustrates a different view of the noisy point cloud of FIG. 20A.
Figure 20D:
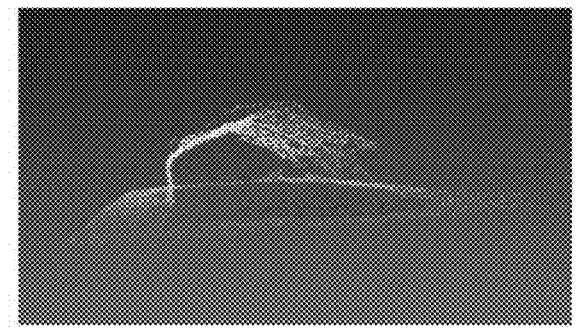
FIG. 20D illustrates a denoised and densified point cloud corresponding to the point cloud of FIG. 20C.

FIGS. 19A, 19C, and 19E illustrate examples of noisy point clouds of a building. FIGS. 19B, D, and F illustrate examples of denoised and densified point clouds corresponding to the point clouds of FIGS. 19A, 19C, and 19E, respectively. FIG. 20A illustrates a noisy point cloud of a greenhouse. FIG. 20B illustrates a denoised and densified point cloud corresponding to the point cloud of FIG. 20A, in accordance with one or more embodiments of the present disclosure. FIG. 20C illustrates a different view of the noisy point cloud of FIG. 20A. FIG. 20D illustrates a denoised and densified point cloud corresponding to the point cloud of FIG. 20C. For example, FIG. 20D illustrates that denoising utilizing techniques described herein preserves sharp edges of the point cloud.

In one or more embodiments, techniques are provided herein to facilitate construction of 3D point clouds. Constructed point clouds may be densified and/or denoised utilizing the densification and denoising techniques described herein. In some aspects, objects and scenes (e.g., real-world objects and scenes) may be projected into 3D point cloud models utilizing active approaches and/or passive approaches. An example active approach may involve using various 3D scanning devices. An example passive approach may be based on structure-from-motion (SfM). In some cases, passive approaches such as those based on SfM may be efficient in cost and implementation while maintaining performance similar to that provided by active approaches.

Figure 21:
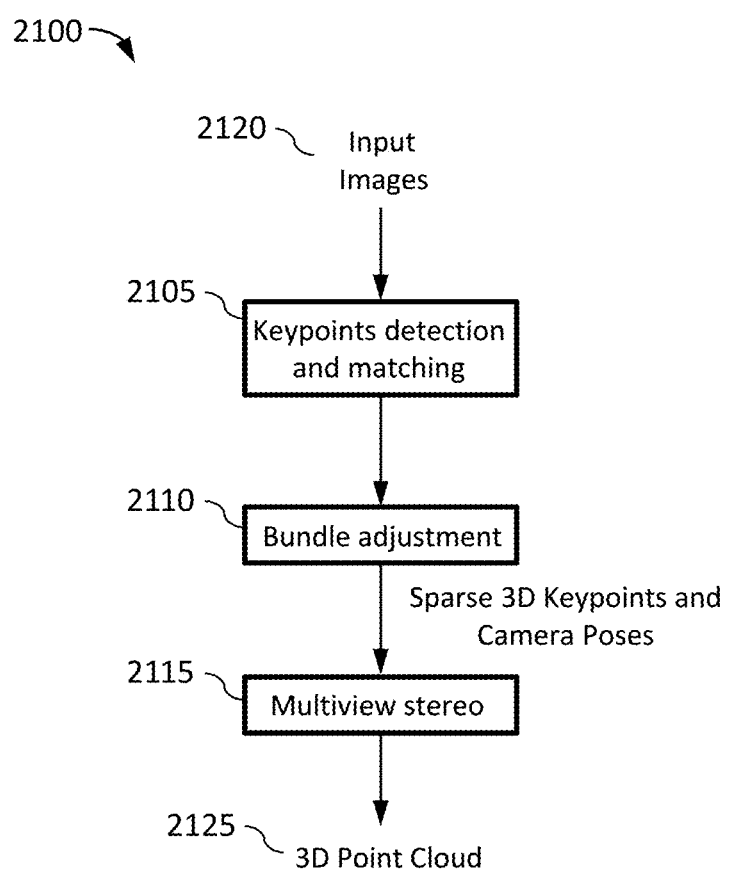
FIG. 21 illustrates a flowchart of an example structure-from-motion process.

In an embodiment, point clouds are constructed based on an SfM pipeline. FIG. 21 illustrates a flowchart of an example SfM process 2100. The blocks of example process are described herein as occurring in serial, or linearly (e.g., one after another). However, multiple blocks of example process may occur in parallel. In addition, the blocks of example process need not be performed in the order shown and/or one or more of the blocks of example process need not be performed. In an embodiment, the processing component 110 of FIG. 1 may be utilized to perform the example process 2100 of FIG. 21.

At block 2105, keypoints detection and matching are performed on input images 2120. Keypoints detection and matching may include detecting blob and corner features in each of the input images 2120 (associated points referred to as keypoints), determining keypoint correspondences across multiple images by matching the keypoints between each pair of the input images 2120 based on their local features, and computing, from these point correspondences, 3D locations of the matched keypoints and the camera pose (e.g., location and orientation) of each of the input images 2120, The input images 2120 may be a sequence of 2D images of an object or a scene. In some aspects, the input images 2120 may be a sequence of partially overlapping 2D images.

At block 2110, bundle adjustment is performed to refine the camera poses and the keypoints' locations obtained at block 2105. In some cases, such bundle adjustment to effectuate refinement may minimize reprojection errors. Sparse 3D keypoints and camera poses are provided as outputs of block 2110. At block 2115, a multiview stereo processing pipeline is performed. The input images 2120 may be processed again to detect a dense set of keypoints with blob and corner features in each of the input images 2120. Keypoints, including those detected at block 2115 and those obtained at block 2110, may be matched. For example, keypoints with similar local features and satisfying constraints of an estimated camera geometry (e.g., provided by the output of block 2110) may be matched. With the matched keypoints, dense 3D keypoints may be triangulated. Using these dense 3D keypoints as seeds, a small patch in nearby empty spaces may be repeatedly expanded, before using visibility constraints to filter erroneous patches. A 3D point cloud 2125 is provided as an output of block 2115. The 3D point cloud may include a dense set of small rectangular patches covering surfaces visible in the input images 2120.

In some embodiments, directly using infrared images as input of an SfM process for point cloud construction may be unsuccessful at block 2105 of FIG. 21 due to issues such as: low resolution generally associated with IR images, which limits a total number of keypoints to be detected in each input image, and/or IR images appearing smoother (e.g., with less details and textures) than vis images, which may make feature detection methods less efficient to detect and match keypoints. Such issues may cause an insufficient number of keypoints for point cloud construction, or increase a risk of false keypoints matching which results in erroneous 3D point locations.

In some embodiments, to mitigate such issues, point clouds are constructed using multi-spectral color information, such as using vis and IR images (e.g., vis and IR image pairs) output from an imaging system (e.g., the imaging system 100). The imaging system may be a dual-camera device that captures visible-light images and IR images. In some aspects, the visible-light images may be utilized for point cloud construction, while co-registered IR images may be utilized to transfer thermal information to the point cloud.

Figure 22:
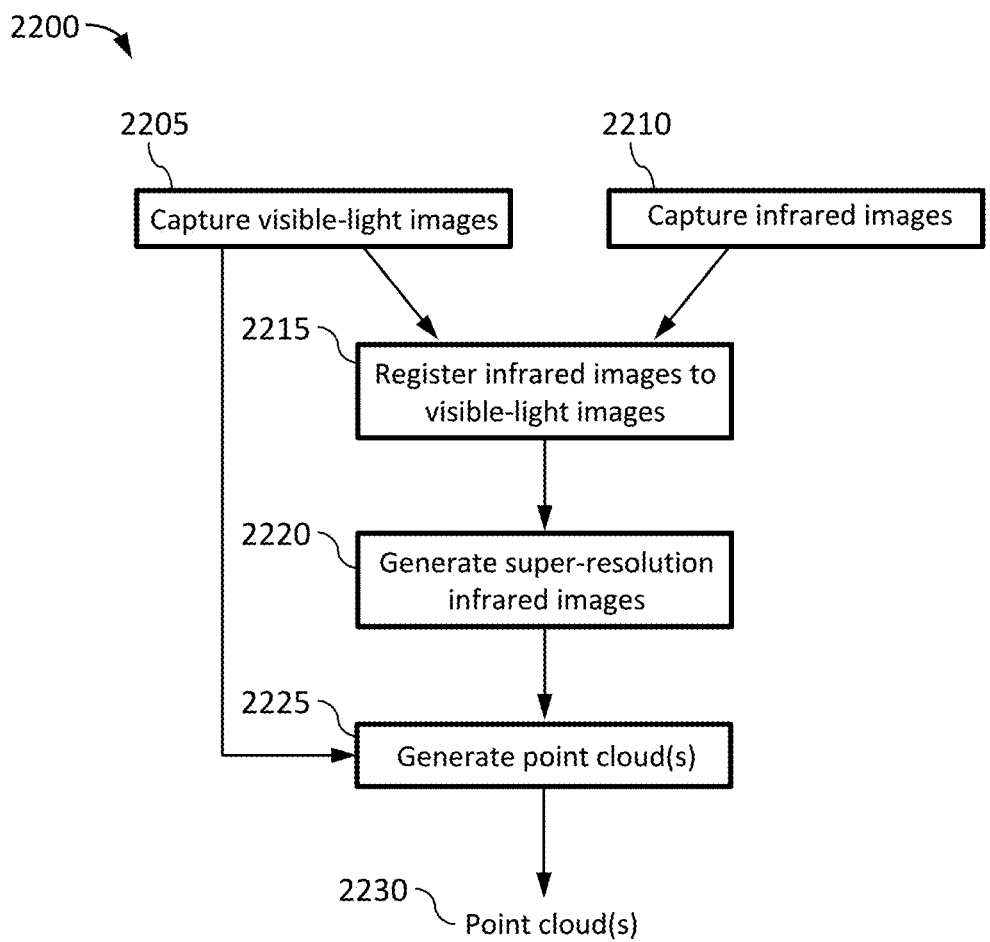
FIG. 22 illustrates a flowchart of an example process for facilitating construction of point clouds in accordance with one or more embodiments of the present disclosure.

FIG. 22 illustrates a flowchart of an example process 2200 for facilitating construction of point clouds in accordance with one or more embodiments of the present disclosure. The blocks of example process are described herein as occurring in serial, or linearly (e.g., one after another). However, multiple blocks of example process may occur in parallel. In addition, the blocks of example process need not be performed in the order shown and/or one or more of the blocks of example process need not be performed. In an embodiment, the process 2200 is based on an SfM approach. For explanatory purposes, the process 2200 is described with reference to the imaging system 100 of FIG. 1; however, the process 2200 may be performed by other imaging systems.

At block 2205, the imaging capture component 130 captures visible-light images. At block 2210, the imaging capture component 130 captures infrared images. For example, the imaging system 100 may be a dual-camera device capable of using the imaging capture component 130 to capture two sets of images (e.g., one set of visible-light images and one set of infrared images). The dual-camera device may include one or more visible-light imaging sensors and one or more infrared imaging sensors. The visible-light images may be overlapping visible-light images. The infrared images may be overlapping infrared images. At block 2215, the processing component 110 registers the infrared images to the visible-light images.

At block 2220, the processing component 110 generates super-resolution infrared images based on visible-light images (e.g., captured at block 2205) and infrared images (e.g., captured at block 2210). Super-resolution infrared images may also be referred to as enhanced resolution infrared images. In this regard, the processing component 110 processes images (e.g., the visible-light images and/or infrared images) to enhance their resolution to obtain super-resolution images. In an embodiment, the processing component 110 performs vis-aided super resolution, in which the visible-light images are utilized to enhance resolution of the infrared images. In some cases, multiple sets of enhanced resolution (e.g., also referred to as super-resolution) infrared images may be generated. For example, a first set of super-resolution infrared images may be generated via a first processing pipeline of the processing component 110, and a second set of super-resolution infrared images may be generated via a second processing pipeline of the processing component 110 different from the first processing pipeline (e.g., different fusion techniques, different filter coefficients, etc.)

Examples of systems and methods for facilitating enhancement of resolution of an image(s) (e.g., infrared image(s)) are provided in U.S. Patent Application Publication No. 2018/0330473, U.S. Patent Application Publication No. 2018/0330474, and U.S. Pat. No. 9,171,361, each of which is incorporated herein by reference in its entirety. In some cases, data contained in one image may be utilized to enhance data contained in another image. For example, edge information contained in visible-light images may be utilized to enhance edge information contained in infrared images.

At block 2225, the processing component 110 constructs one or more point clouds 2230 based on the visible-light images and/or the super-resolution infrared images. In this regard, the processing component 110 may take three sets of registered images as input to generate three point clouds. The three sets of registered images may include a set of visible-light images (e.g., captured at block 2205), a first set of super-resolution infrared images (e.g., generated via a first processing pipeline), and a second set of super-resolution infrared images (e.g., generated via a second processing pipeline). In an aspect, the visible-light images may be used through an entire SfM process to achieve locations/coordinates of generated 3D points, mapping with red-green-blue (RGB) colors, whereas the sets of super-resolution infrared images may be read in a multiview stereo step (e.g., block 2115 of FIG. 21) to transfer thermal information to the vis-generated 3D points to generate point clouds.

Figure 23A:
FIG. 23A illustrates an example visible-light image.
Figure 23D:
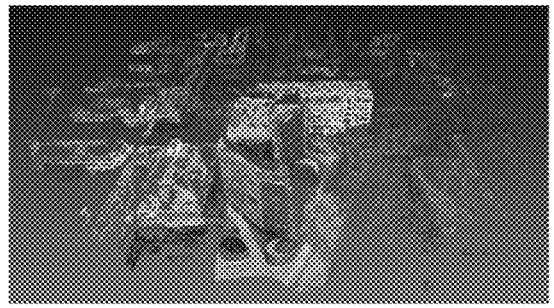
FIGS. 23D, 23E, and 23F illustrate an output point cloud constructed using, respectively, at least the visible-light image of FIG. 23A, the super-resolution infrared image of FIG. 23B, and the super-resolution infrared image of FIG. 23C, in accordance with one or more embodiments of the present disclosure.
Figure 23B:
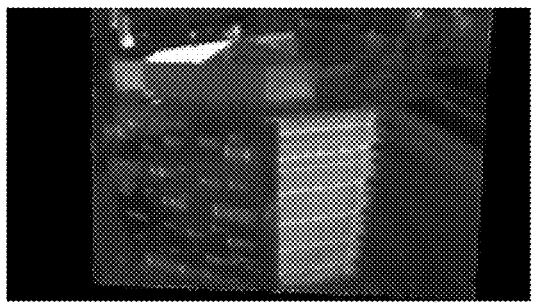
FIGS. 23B and 23C illustrate examples of super-resolution infrared images.
Figure 23E:
Figure 23C:
Figure 23F:

In some cases, the three sets of registered images may be utilized to generate three point clouds: a visible-light point cloud based on the visible-light images, a first infrared point cloud based at least on the first set of super-resolution infrared images, and a second infrared point cloud based at least on the second set of super-resolution infrared images. In an implementation, these three point clouds have points of the same coordinates but different colors. FIGS. 23A, 23B, and 23C provide an example image among the visible-light images, the first set of super-resolution infrared images, and the second set of super-resolution infrared images, respectively. The infrared images of FIGS. 23B and 23C are corresponding infrared images of the visible-light image of FIG. 23A. The visible-light image may have a resolution of 1920×1080 px. Prior to super-resolution, infrared images (e.g., captured at block 2210) may have a resolution of 160×120 px. FIGS. 23D, 23E, and 23F provide an output point cloud using, respectively, at the visible-light images, the first set of super-resolution infrared images, and the second set of super-resolution infrared images as input data.

In an embodiment, the set(s) of point clouds may be generated using a Bundler and patch-based multi-view stereo (PMVS) software. In an aspect, with reference back to FIG. 21, the Bundler may be utilized to perform blocks 2105 and 2110 and the PMVS may be utilized to perform block 2115 to generate a constructed 3D point cloud. The Bundler and PMVS may take the three sets of registered images as input to generate three point clouds.

Although the process 2200 is described above with reference to utilizing visible-light images to enhance (e.g., enhance resolution of) infrared images, visible-light images may be utilized to enhance other visible-light images, infrared images may be utilized to enhance visible-light images and/or other infrared images, and so forth. Dependent on application, images associated with one or more wavebands (e.g., ultraviolet bands, etc.) outside of the visible-light spectrum and/or infrared spectrum may be utilized together with or in place of the visible-light images and/or the infrared images described with respect to FIG. 22.

When using an SFM process, such as the example processes 2100 of FIGS. 21 and 2200 of FIG. 22, to construct the point cloud of a scene, different conditions of each region of the scene may affect the number of 3D points generated in the reconstruction process. For instance, in some cases, some regions of the scene may be covered by fewer images than other regions and/or some regions may have fewer corner/edge features than other regions. In either or both these cases, the SfM process may output a point cloud with non-uniform local point densities.

In some cases, the point clouds output from the SfM process may contain wrongly placed points even when using visible-light images for the reconstruction. As one example, images of low quality (e.g., color demosaicing artefacts, noise) may decrease the number of keypoints detected or generate incorrect keypoint matches. As another example, some areas that lack texture may cause an insufficient number of keypoints or erroneous keypoint matches. As another example, long distances from a camera to a scene (e.g., using a flying drone to take photos of a large area) may affect the accuracy of an estimated camera geometry from the SfM process. Each of these examples may be associated with point misplacement in constructed 3D point clouds. An example of a point cloud denoising process combined with a densification component is provided with respect to FIG. 17. In some cases, the point cloud denoising process described herein may be at least partially based on an LPA-ICI approach. Depending on a size of the point cloud, the point cloud may be first split into several smaller sub-PCDs. Each sub-PCD may then be densified and filtered independently in order to reduce a running time of the process. A global density threshold value may be computed to decide which local region is to be densified. The noise level of each sub-PCD may be computed separately to facilitate adaptive filtering of each sub-PCD.

Figure 24:
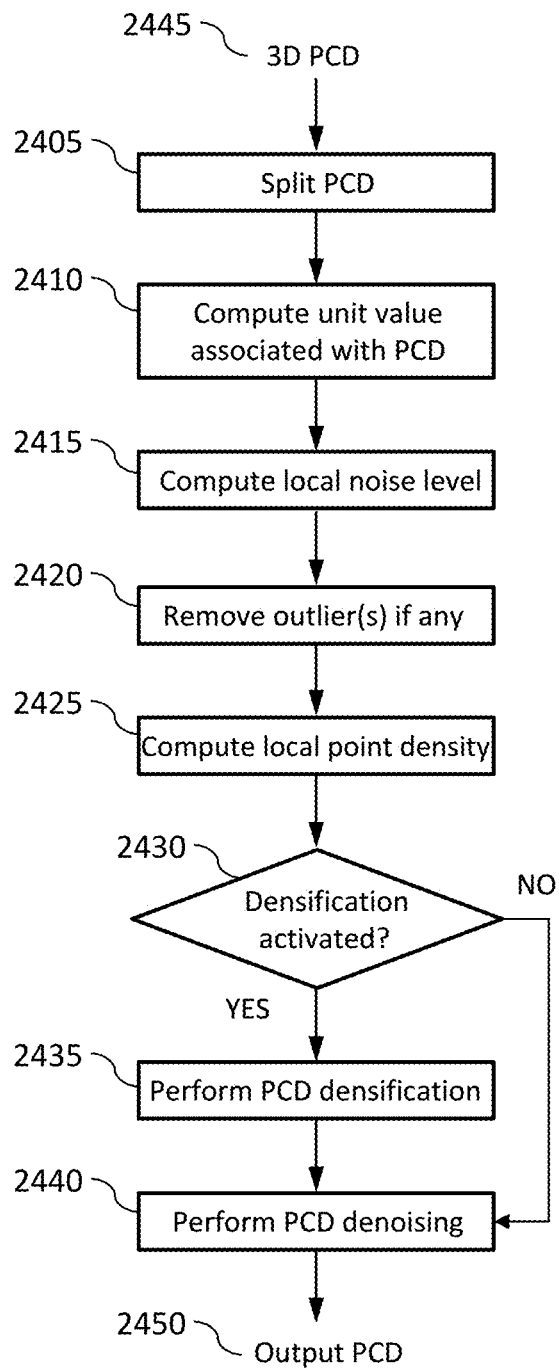
FIG. 24 illustrates a flowchart of an example process for facilitating point cloud densification and denoising in accordance with one or more embodiments of the present disclosure.

FIG. 24 illustrates a flowchart of an example process 2400 for facilitating 3D point cloud densification and denoising in accordance with one or more embodiments of the present disclosure. The blocks of example process are described herein as occurring in serial, or linearly (e.g., one after another). However, multiple blocks of example process may occur in parallel. In addition, the blocks of example process need not be performed in the order shown and/or one or more of the blocks of example process need not be performed. For explanatory purposes, the process 2400 is described with reference to the imaging system 100 of FIG. 1; however, the process 2400 may be performed by other imaging systems.

At block 2405, a 3D point cloud 2445 is split into several sub-PCDs. In an embodiment, the 3D point cloud 2445 may be the noisy point cloud 1745 of FIG. 17. In an embodiment, the 3D point cloud 2445 may be a 3D point cloud generated by the process 2100 or the process 2200. For example, the 3D point cloud 2445 may be one of the point cloud(s) 2240 of FIG. 22. Splitting the 3D point cloud 2445 may facilitate parallelization; reduced computational complexity for the densification process, such as a Delaunay Triangulation-based densification process; speeding a nearest neighbor point search (e.g., part of a point cloud denoising process); and/or outlier removal. In one example, the PCD point cloud and its sub-PCDs with a rectangular-hexahedron shaped grid may be repeatedly divided until the number of points of the sub-PCD in every rectangular-hexahedron box is smaller than a predefined threshold value. As an example, the predefined threshold value may be set to 10000. In an aspect, spatial position information of the points of the point cloud 2445 are utilized for densification and denoising.

At block 2410, a unit value associated with the 3D point cloud 2445 is determined. The unit value is determined based on a distance between each point and its closest neighbor. In the 3D point cloud 2445, the points may be irregularly placed in the 3D space such that the 3D point cloud 2445 is not associated with a uniform grid (such as in a 2D image) and not amenable to defining the size of a neighborhood window for implementing an LPA-ICI process. The unit value may be utilized to mitigate such issues. An example process to obtain the unit value in accordance with one or more embodiments is provided in pseudocode below. As shown below, for each sub-PCD, a distance between a point p and a point q of the sub-PCD is determined. The unit value (denoted as scale_in_use in the pseudocode below) is determined based on a median associated with determined distances.

```
1:  for {sub-PCD_n|1 ≤ n ≤ N} do     ▸ N: the number of sub-PCDs in the PCD
2:    for {Point_p|1 ≤ p ≤ P, Point_p ∈ sub-PCD_n} do
3:                                    ▸ P: the number of points in sub-PCD_n
4:      for {Point_q|1 ≤ q ≤ P, q ≠ p, Point_q ∈ sub-PCD_n} do 5:            dis_{p,q} = √(‖Point_p − Point_q‖²)

6:      end for
7:      disMin_p = min{dis_{p,1}, . . . dis_{p,p−1}, dis_{p,p+1}, . . . , dis_{p,P}}
8:    end for
9:    Dis_n = median{disMin_1, . . . , disMin_P}
10: end for
11: scale_in_use = median{Dis_1, . . . , Dis_N}
```

Figure 25A:
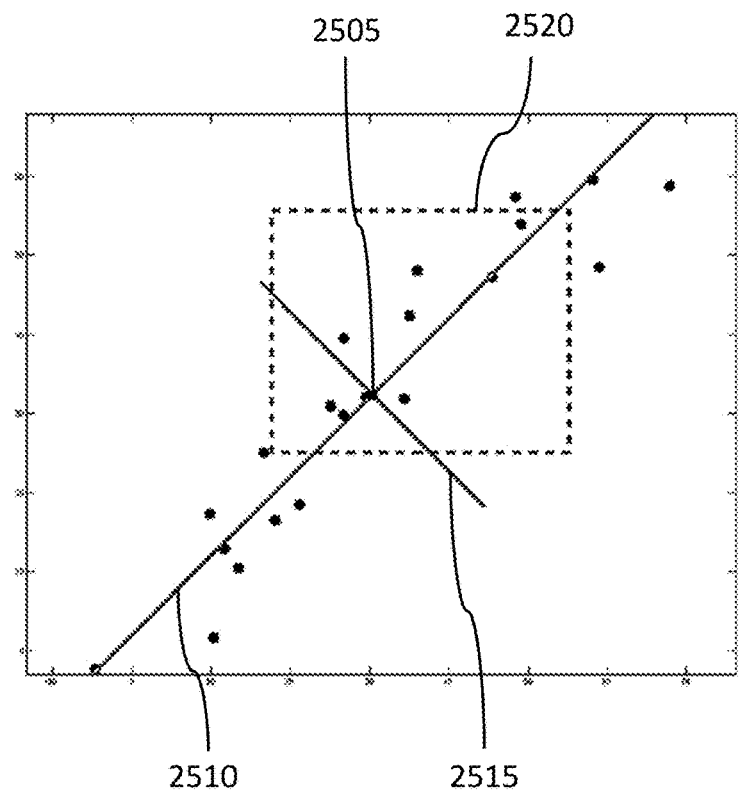
FIG. 25A illustrates an LCS of a KNN of a point p.
Figure 25B:
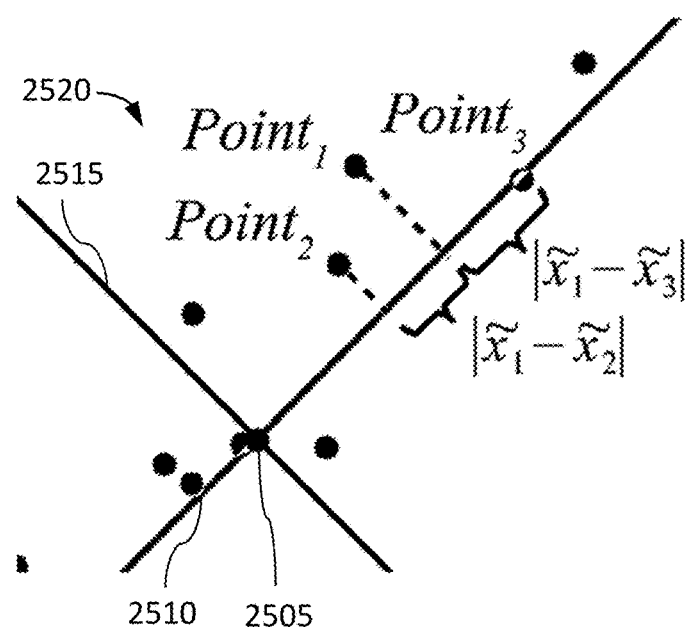
FIG. 25B illustrates a zoom-in view of a portion of the LCS of FIG. 25A.

At block 2415, local noise level is computed. In some cases, noise level corrupting the points for each sub-PCD may be determined (e.g., estimated), and the determined noise may be subsequently leveraged to denoise each sub-PCD (e.g., denoise each sub-PCD independently). In an aspect, the noise level may be determined based on the LCS of each point and its KNN. A principal component analysis (PCA) may be employed to compute the LCS and a median absolute deviation estimator may be employed to compute the noise level. In some cases, the noise level of a PCD may be determined in $\mathbb{R}^2$ or $\mathbb{R}^3$. For example, an example computation of the noise level of a PCD in $\mathbb{R}^2$ is illustrated with respect to FIGS. 25A and 25B. FIG. 25A illustrates an LCS of a KNN of a point p. A point 2505 is a centroid of the KNN indicating an origin of the LCS. A line 2510 may be an estimate tangent, representing the X-axis of the LCS. A line 2515 may be an estimate normal, representing the Y-axis of the LCS. FIG. 25B illustrates a portion 2520 of the LCS of FIG. 25A. An example process to obtain local noise level for each sub-PCD in accordance with one or more embodiments is provided by the pseudocode below. As shown below, the noise level values for all sub-PCDs are computed and stored in an array denoted by sigma_pcd. An example size of KNN utilized during noise level computation may be set to 300.

```
1:  for {sub-PCD_n|1 ≤ n ≤ N} do              ▷ N: the number of sub-PCDs in the PCD
2:      for {Point_p|1 ≤ p ≤ P, Point_p ∈ sub-PCD_n} do
3:                                             ▷ P: the number of points in sub-PCD_n
4:          find the K-NN of Point_p, denote as K-NN_p
5:          compute the LCS of K-NN_p by using PCA        ▷ See one example in FIG. 25 A
6:          for {K-NN_p^i|1 ≤ i ≤ K, K-NN_p^i ∈ K-NN_p} do
7:                                             ▷ denote the i-th point in K-NN_p as K-NN_p^i
8:                                             ▷ denote the local coordinates of K-NN_p^i as (x̄_p^i, ȳ_p^i)
9:              j = argmin(|x̄_p^i − x̄_p^j|, 1 ≤ j ≤ K, j ≠ i, K-NN_p^j ∈ K-NN_p)
10:                                            ▷ See one example in FIG. 25B
11:             d_i = (ȳ_i − ȳ_j)/√2
12:         end for
13:         σ̂_p = median(|d|)/0.6745
14:     end for
15:     sigma_pcd(n) = median(σ̂)
16: end for
```

At block 2420, outlier removal is performed on the sub-PCDs to remove points in the sub-PCDs. In an aspect, outliers may include isolated points far from their true positions and have few close neighbors. To distinguish outliers from other points, distances between a point and its KNN may be computed. In one case, outlier removal is implemented independently in every sub-PCD. In a case that no points are determined to be outliers, no points are removed at block 2420. An example process to perform outlier removal independently in every sub-PCD in accordance with one or more embodiments is provided by the pseudocode below. In the pseudocode, a parameter filter_percent may be set to control a percentage of points to remove in each sub-PCD. As an example, filter_percent may be set to 0.01.

```
1:  for {sub-PCD_n|1 ≤ n ≤ N} do              ▷ N: the number of sub-PCDs in the PCD
2:      for {Point_p|1 ≤ p ≤ P, Point_p ∈ sub-PCD_n} do
3:                                             ▷ P: the number of points in sub-PCD_n
4:          find the K − NN of Point_p, denote as K − NN_p
5:          for {K − NN_p^i|1 ≤ i ≤ K, K − NN_p^i ∈ K − NN_p} do
6:                                             ▷ denote the i-th point in K − NN_p as K − NN_p^i
7:              w_i = exp( −‖K − NN_p^i − Point_P‖² / (2 × sigma_pcd(n)) )
8:          end for
9:          W_p = Σ_{i=1}^K w_i
10:     end for
11:     W' = sort(W, 'ascend')
12:     num_outlier = round(filter_percent × P)
13:                                            ▷ set filter_percent × 100% of points in sub-PCD_n to be deleted
14:     delete those points whose W ≤ W'_{num_outlier}
15: end for
```

At block 2425, local point density is computed. In an aspect, the local point density may be a number of neighboring points contained within a fixed-radius ball centered in each of the points. A parameter ball_radius may be set relative to the scale_in_use parameter. As an example, ball_radius=3×scale_in_use.

At block 2430, a determination is made as to whether densification is activated or deactivated (e.g., also referred to as not activated). In an aspect, the determination may be made by checking a value of a flag. For example, a densification flag value may be set such that a flag value of 1 is indicative of densification being activated and a flag value of 0 is indicative of densification being deactivated. In this regard, a densification process (e.g., also referred to as a densification stage) increases (e.g., increases significantly) a number of points in the PCDs and thus may be computationally intensive and time consuming. In a case of a fast test running, densification can be deactivated. If the determination is that densification is deactivated, the process 2400 proceeds to block 2440. In this regard, the PCD provided as output at block 2425 is denoised but not densified. An example process to denoise PCDs is described with respect to the process 1700 of FIG. 17. Block 2435 is performed to obtain a PCD 2450 which has been filtered. In an embodiment, blocks 2405, 2410, 2415, 2420, and 2425 may be considered a preparation stage for a densification stage and/or a denoising stage.

If the determination is that densification is activated, the process 2400 proceeds to block 2435. At block 2435, densification is performed on the PCD provided as output at block 2425. In an aspect, the densification is performed based on Delaunay triangulation. Delaunay triangulation may be used to construct tetrahedra with each four points, and one more point is then added in the center of the tetrahedra.

Constraints may be applied to determine whether to add or remove points. As a first step, normal vectors of each point may be utilized as a constraint. In this first step, if the normal vector of the four apexes of a tetrahedron are very different, a point is not added inside the tetrahedron. As a second step, local density of the point cloud may be utilized as a constraint. In this second step, after computation of the local point density surrounding each point, median and maximum point density values may be determined in the whole PCD. For those points with a local point density larger than the median point density value, a point is not added in the corresponding tetrahedron.

As a third step, if a tetrahedron passes the constraints of the first and second steps, a new point is added in the center of the tetrahedron. A mean distance from the newly added point to the four apexes of the tetrahedron may be determined. If the mean distance is greater than an upper threshold distance or lower than a lower threshold distance, the newly added point may be removed. After the first through third steps, a dense point cloud has been obtained. As a fourth step, after the first through third steps, a local density of newly added points may be determined to identify over-densified parts, and points whose local point density is larger than the maximum point density value determined at the second step may be removed. As a fifth step, the first through fourth steps may be repeated until no more points are added or removed.

In proceeding from block 2430 to block 2435, the densified PCDs are provided for denoising at block 2435. Block 2435 is performed to obtain a PCD 2450 which has been densified and filtered. An example process to denoise densified PCDs is described with respect to the process 1700 of FIG. 17 (e.g., blocks 1735 and 1740 of FIG. 17).

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method, comprising:
    determining a respective local coordinate system for each point of a point cloud;
    determining a respective first adaptive-shape neighborhood for each point of the point cloud based on each respective local coordinate system;
    performing filtering associated with each respective first adaptive-shape neighborhood to obtain a respective second adaptive-shape neighborhood for each point of the point cloud;
    determining local estimates for points inside each of the second adaptive-shape neighborhoods;
    determining a vector normal to a plane associated with at least one of the local estimates; and
    aggregating the local estimates for each point of the point cloud based on the vector to obtain a denoised point cloud.

2. The method of claim 1, further comprising generating the point cloud based on one or more visible-light images captured by a visible-light imaging device and one or more infrared images captured by an infrared imaging device.

3. The method of claim 1, further comprising determining an adaptive directional size based on a first direction in the local coordinate system of a first point of the point cloud and a second direction in the local coordinate system of a second point of the point cloud, wherein the filtering is based on the adaptive directional size.

4. The method of claim 1, wherein the respective local coordinate system of a point of the point cloud is based on principal axes of a predetermined number of nearest neighbors of the point.

5. The method of claim 1, wherein at least one of the first adaptive-shape neighborhoods is an anisotropic adaptive-shape neighborhood, and wherein at least one of the second adaptive-shape neighborhoods is an anisotropic adaptive-shape neighborhood.

6. The method of claim 1, further comprising:
densifying the point cloud to obtain a densified point cloud; and
associating the local estimates with the densified point cloud,
wherein the aggregating is based on the local estimates and the associating.

7. The method of claim 6, wherein the densifying is based on normal vectors associated with each point of the point cloud and/or local point density associated with each point of the point cloud.

8. The method of claim 1, wherein the determining the respective first adaptive-shape neighborhood for each point is based on local polynomial approximation intersection of confidence intervals (LPA-ICI) approach.

9. The method of claim 1, wherein the filtering comprises weighted order statistics (WOS) filtering.

10. The method of claim 1, wherein the aggregating is based on local polynomial approximation.

11. The method of claim 1, further comprising:
splitting the point cloud into a plurality of sub-point clouds; and
selectively densifying one or more of the plurality of sub-point clouds based on a density threshold value.

12. The method of claim 1, further comprising splitting the point cloud into a plurality of sub-point clouds, wherein the performing filtering comprises, for each sub-point cloud of the plurality of sub-point clouds, performing filtering of the sub-point cloud based on a noise level associated with the sub-point cloud.

13. An imaging system, comprising:
one or more processors; and
a non-transitory machine readable medium comprising instructions stored therein, which when executed by the one or more processors, cause the one or more processors to perform operations comprising:
determining a respective local coordinate system for each point of a point cloud;
determining a respective first adaptive-shape neighborhood for each point of the point cloud based on each respective local coordinate system;
performing filtering associated with each respective first adaptive-shape neighborhood to obtain a respective second adaptive-shape neighborhood for each point of the point cloud;
determining local estimates for points inside each of the second adaptive-shape neighborhoods;
densifying the point cloud to obtain a densified point cloud;
associating the local estimates with the densified point cloud; and
aggregating, based on the local estimates and the associating, the local estimates for each point of the point cloud to obtain a denoised point cloud.

14. The imaging system of claim 13, further comprising at least one of a visible-light imaging device or an infrared imaging device.

15. The imaging system of claim 14, wherein the infrared imaging device is a thermal imaging device.

16. The imaging system of claim 13, wherein the operations further comprise generating the point cloud based on one or more visible-light images captured by a visible-light imaging device and one or more infrared images captured by an infrared imaging device.

17. The imaging system of claim 13, wherein the operations further comprise determining a vector normal to a plane associated with at least one of the local estimates, wherein the aggregating is further based on the vector.

18. The imaging system of claim 13, wherein the operations further comprise determining an adaptive directional size based on a first direction in the local coordinate system of a first point of the point cloud and a second direction in the local coordinate system of a second point of the point cloud, wherein the filtering is based on the adaptive directional size.

19. The imaging system of claim 13, wherein the respective local coordinate system of a point of the point cloud is based on principal axes of a predetermined number of nearest neighbors of the point.

20. The imaging system of claim 13, wherein the densifying is based on normal vectors associated with each point of the point cloud and/or local point density associated with each point of the point cloud.

* * * * *

UNITED STATES PATENT AND TRADEMARK OFFICE
CERTIFICATE OF CORRECTION

PATENT NO. : 11,354,779 B2
APPLICATION NO. : 16/911169
DATED : June 7, 2022
INVENTOR(S) : Zhongwei Xu and Alessandro Foi It is certified that error appears in the above-identified patent and that said Letters Patent is hereby corrected as shown below:

In the Specification

In Column 11, Line 4, change "with the imaging sy stem)." to --with the imaging system).--.

In Column 21, Line 62, change "$X_{LCS}^p$, $Y_{LCS}^p$, and $Z_{LCS}^p$," to --$X^p_{LCS}$, $Y^p_{LCS}$, and $Z^P_{LCS}$,--.

In Column 22, Line 17, change "$X_{LCS}^p$-$Y_{LCS}^p$" to --$X^p_{LCS}$-$Y^p_{LCS}$--.

In Column 22, Line 19, change "$Z_{LCS}^p$" to --$Z^p_{LCS}$--.

In Column 22, Line 20, change "$X_{LCS}^p$-$Y_{LCS}^p$" to --$X^p_{LCS}$-$Y^p_{LCS}$--.

In Column 22, Line 22-23, change "$X_{LCS}^p$, $Y_{LCS}^p$ and $Z_{LCS}^p$," to --$X^p_{LCS}$, $Y^p_{LCS}$ and $Z^P_{LCS}$,--.

Signed and Sealed this
Thirtieth Day of August, 2022

Katherine Kelly Vidal
*Director of the United States Patent and Trademark Office*